US011341096B2

(12) United States Patent
Clingman et al.

(10) Patent No.: US 11,341,096 B2
(45) Date of Patent: May 24, 2022

(54) PRESENTING AND EDITING RECENT CONTENT IN A WINDOW DURING AN EXECUTION OF A CONTENT APPLICATION

(71) Applicant: SONY INTERACTIVE ENTERTAINMENT INC., Tokyo (JP)

(72) Inventors: Dustin S. Clingman, San Francisco, CA (US); Andrew D. Herman, Lake Forest, CA (US); Masahiro Fujihara, Tokyo (JP); Kiyobumi Matsunaga, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/003,481

(22) Filed: Aug. 26, 2020

(65) Prior Publication Data

US 2022/0066990 A1    Mar. 3, 2022

(51) Int. Cl.
| | | |
|---|---|---|
| G06F 16/16 | (2019.01) | |
| G06F 16/17 | (2019.01) | |
| A63F 13/60 | (2014.01) | |
| G06F 3/0482 | (2013.01) | |
| G06F 16/14 | (2019.01) | |

(52) U.S. Cl.
CPC ............ *G06F 16/168* (2019.01); *A63F 13/60* (2014.09); *G06F 3/0482* (2013.01); *G06F 16/156* (2019.01); *G06F 16/173* (2019.01)

(58) Field of Classification Search
None
See application file for complete search history.

(56) References Cited

U.S. PATENT DOCUMENTS

2009/0193364 A1* 7/2009 Jarrett ................. G06F 3/04817
715/838
2012/0100910 A1    4/2012 Eichom et al.
(Continued)

FOREIGN PATENT DOCUMENTS

| CN | 113426140 A | 9/2021 |
|---|---|---|
| WO | 2010038985 A2 | 4/2010 |

OTHER PUBLICATIONS

PCT/US2021/046911 , "International Search Report and Written Opinion", dated Dec. 3, 2021, 13 pages.

*Primary Examiner* — Stella Higgs
(74) *Attorney, Agent, or Firm* — Kilpatrick Townsend & Stockton LLP

(57) ABSTRACT

Techniques for presenting recently generated content on a display include presenting, based on an execution of an application, content on the display, generating a content file including at least one of a video or a screenshot of the application, storing the content file, receiving, based on user input at the input device, a request to access one or more of content files from the folder, wherein the request is received while the execution of the application continues, and presenting, in response to the request, a window over at least a first portion of the content while the execution of the application continues, wherein the window previews the content file and indicates the recency of the content file, and includes a selectable option to edit for length, crop, or annotate in the window any of the content file or the other content files.

23 Claims, 17 Drawing Sheets

(56) References Cited

U.S. PATENT DOCUMENTS

| | | | |
|---|---|---|---|
| 2012/0308209 A1* | 12/2012 | Zaletel | G11B 31/006 386/278 |
| 2013/0244785 A1* | 9/2013 | Gary | A63F 13/497 463/42 |
| 2013/0260896 A1 | 10/2013 | Miura et al. | |
| 2015/0224395 A1* | 8/2015 | Trombetta | A63F 13/497 463/24 |
| 2015/0251093 A1* | 9/2015 | Trombetta | A63F 13/49 463/24 |
| 2017/0200473 A1* | 7/2017 | Moore | H04N 21/47205 |
| 2019/0147026 A1 | 5/2019 | Jon et al. | |
| 2020/0147500 A1* | 5/2020 | Mahlmeister | A63F 13/497 |

\* cited by examiner

PRESENTING AND EDITING RECENT CONTENT IN A WINDOW DURING AN EXECUTION OF A CONTENT APPLICATION

BACKGROUND

Graphical user interfaces (GUIs) are the predominant type of interfaces available to users for interacting with computer systems. A GUI includes selectable icons to launch applications. Typically, upon a launch of a first application, the first application is presented in a first window. The first application may not provide user intuitive tools to record content generated by the first application while it is running or to view recorded content while the first application is also still running.

To illustrate, consider an example of a GUI of a video game system hosting a video game application. The GUI presents a home page that includes a video game icon. From this home page, a video game player selects the video game icon to launch the video game application. Video game content is then presented on the display of the video game system. While the video game content is presented, the video game player may wish to record content from the video game or to view content that was previously recorded, for which the video game application does not provide tools.

Hence, although a GUI can be an effective user interface to launch and play video game applications, there is a need for an improved GUI that allows a user to generate content from user applications while running, and to provide intuitive and streamlined navigation through the native interface.

BRIEF SUMMARY

Embodiments of the present disclosure relate to techniques for better content generation and navigation in a graphical user interface (GUI).

In an embodiment, a method for presenting recently generated content on a display, the method implemented by a computer system, includes presenting, based on an execution of a video game application, video game content on the display, wherein the video game content is controlled via an input device coupled with the computer system, generating a content file that includes at least one of a video or a screenshot corresponding to a gameplay of the video game application, storing the content file, wherein the content file is organized with other content files in a folder based on the recency of each content file, receiving, based on user input at the input device, a request to access one or more of content files from the folder, wherein the request is received while the execution of the video game application continues, and presenting, in response to the request, a window over at least a first portion of the video game content while the execution of the video game application continues, wherein the window previews the content file and indicates the recency of the content file relative to the other content files, and wherein the window includes a first selectable option to at least one of edit for length, crop, or annotate in the window any of the content file or the other content files.

In an example, the window further includes additional options to present in the window or share from the window any of the content file or the other content files, and wherein the method further includes presenting, while the presentation of the video game content continues, a menu over at least a second portion of the video game content, wherein the menu includes a second selectable option to generate the content file, and wherein the content file is generated based on a selection of the second selectable option.

In an example, the second selectable option includes selectable time lengths for already stored video data, and wherein the method further includes storing, in a ring buffer, video data corresponding to the video game content, and wherein generating the content file includes receiving a selection of a time length from the selectable time lengths, and retrieving, from the ring buffer, the latest video data having the time length, wherein the video of the content file corresponds to the latest video data.

In an example, the menu includes a third selectable option to at least one of: select a type of the content file, select a resolution of the video of the content file, include audio data generated by a microphone coupled with the computer system, or include audio data received from other computer systems, and wherein the content file is generated further based on a selection of the third selectable option. In an example, the menu includes a third selectable option to request the window, wherein receiving the request includes receiving a selection of the third selectable option.

In an example, the method further includes presenting, while the presentation of the menu continues, a notification that the content file was generated.

In an example, the method further includes storing, in a ring buffer, video data corresponding to the video game content, determining a start and an end of an event within the gameplay, and retrieving, from the ring buffer, a portion of the video data corresponding to a time length between the start and the end of the event, wherein the video of the content file corresponds to the portion of the video data.

In an example, the method further includes receiving an activation of a button on the input device, wherein the button is associated with the menu, and wherein the menu is presented in response to the activation of the button.

In an example, the method further includes receiving an activation of a button on the input device, wherein a first type of the activation is associated with the video and includes at least one of a single button selection or a button hold, wherein a second type of the activation is associated with the screenshot and includes at least one of a multi-button selection or a longer button hold, and wherein the content file is generated in response to the activation and includes one of the video or the screenshot based on a type of the activation.

In an example, the window is presented in a first presentation state and has a first size, and wherein the method further includes receiving a selection of the first selectable option, and presenting, in response to the selection of the first selectable option and over at least a second portion of the video game content, the window in a second presentation state and having a second size, wherein the second size is larger than the first size, and wherein the second presentation state includes additional selectable options relative to the first presentation state.

In an example, the method further includes presenting, based on the first selectable option being to present, the content file in the window while the window is presented in the second presentation state, presenting, based on the first selectable option being to edit, edit options and save options in the window while the window is presented in the second presentation state, or present, based on the first selectable option being to share, share options in the window while the window is presented in the second presentation state.

In an example, the method further includes presenting the window in the first presentation state again upon a completion of a presentation, an edit, or a share of the content file via the window while the window was in the second presentation state.

In an example, the method further includes presenting, while the execution of the video game application continues, a plurality of windows that includes the window, wherein the plurality of windows are presented in a third presentation state, each has a third size, and each corresponds to a different application, wherein the third size is smaller than the first size, and wherein the first presentation state includes additional selectable options relative to the third presentation state, and receiving a selection of the window from the plurality of windows, wherein the window is presented in the first presentation state in response to the selection.

In an example, user inputs from the input device control the window while the window is presented, and the method further includes stopping the presentation of the window, and switching controls of additional user inputs from the input device to the video game application upon stopping the presentation of the window.

In an example, the content file is previewed in the window based on the content file having the latest recency, and wherein the method further includes receiving a user interaction with the window to preview a second content file from the folder, and replacing, while the first selectable option remains presented in the window, a preview of the content file with a preview of the second content file.

In an example, the other content files include a video file generated by a camera coupled with the computer system.

In an embodiment, a computer system includes one or more processors and one or more memories storing computer-readable instructions that, upon execution by at least one of the one or more processors, configure the computer system to present, based on an execution of a video game application, video game content on a display, wherein the video game content is controlled via an input device coupled with the computer system, generate a content file that includes at least one of a video or a screenshot corresponding to a gameplay of the video game application, store the content file, wherein the content file is organized with other content files in a folder based on recency of each content file, receive, based on user input at the input device, a request to access one or more of content files from the folder, wherein the request is received while the execution of the video game application continues, and present, in response to the request, a window over at least a first portion of the video game content while the execution of the video game application continues, wherein the window previews the content file and indicates the recency of the content file relative to the other content files, and wherein the window includes a first selectable option to at least one of edit for length, crop, or annotate in the window any of the content file or the other content files.

In an example, the execution of the computer-readable instructions further configure the computer system to present, while the presentation of the video game content continues, a menu over at least a second portion of the video game content, wherein the menu includes a second selectable option to generate the content file from already stored video data and to define a time length for the content file, store, in a ring buffer, video data corresponding to the video game content, and wherein generating the content file includes retrieving, from the ring buffer, latest video data having the time length, wherein the video of the content file corresponds to the latest video data.

In an embodiment, one or more non-transitory computer-readable storage media storing instructions that, upon execution on a computer system, cause the computer system to perform operations including presenting, based on an execution of a video game application, video game content on a display, wherein the video game content is controlled via an input device coupled with the computer system, generating a content file that includes at least one of a video or a screenshot corresponding to a gameplay of the video game application, storing the content file, wherein the content file is organized with other content files in a folder based on recency of each content file, receiving, based on user input at the input device, a request to access one or more of content files from the folder, wherein the request is received while the execution of the video game application continues, and presenting, in response to the request, a window over at least a first portion of the video game content while the execution of the video game application continues, wherein the window previews the content file and indicates the recency of the content file relative to the other content files, and wherein the window includes a first selectable option to at least one of edit for length, crop, or annotate in the window any of the content file or the other content files.

In an example, the window is presented in a first presentation state and has a first size, and wherein the operations further include receiving a selection of the first selectable option, and presenting, in response to the selection of the first selectable option and over at least a second portion of the video game content, the window in a second presentation state and having a second size, wherein the second size is larger than the first size, and wherein the second presentation state includes additional selectable options relative to the first presentation state.

Figure 1:
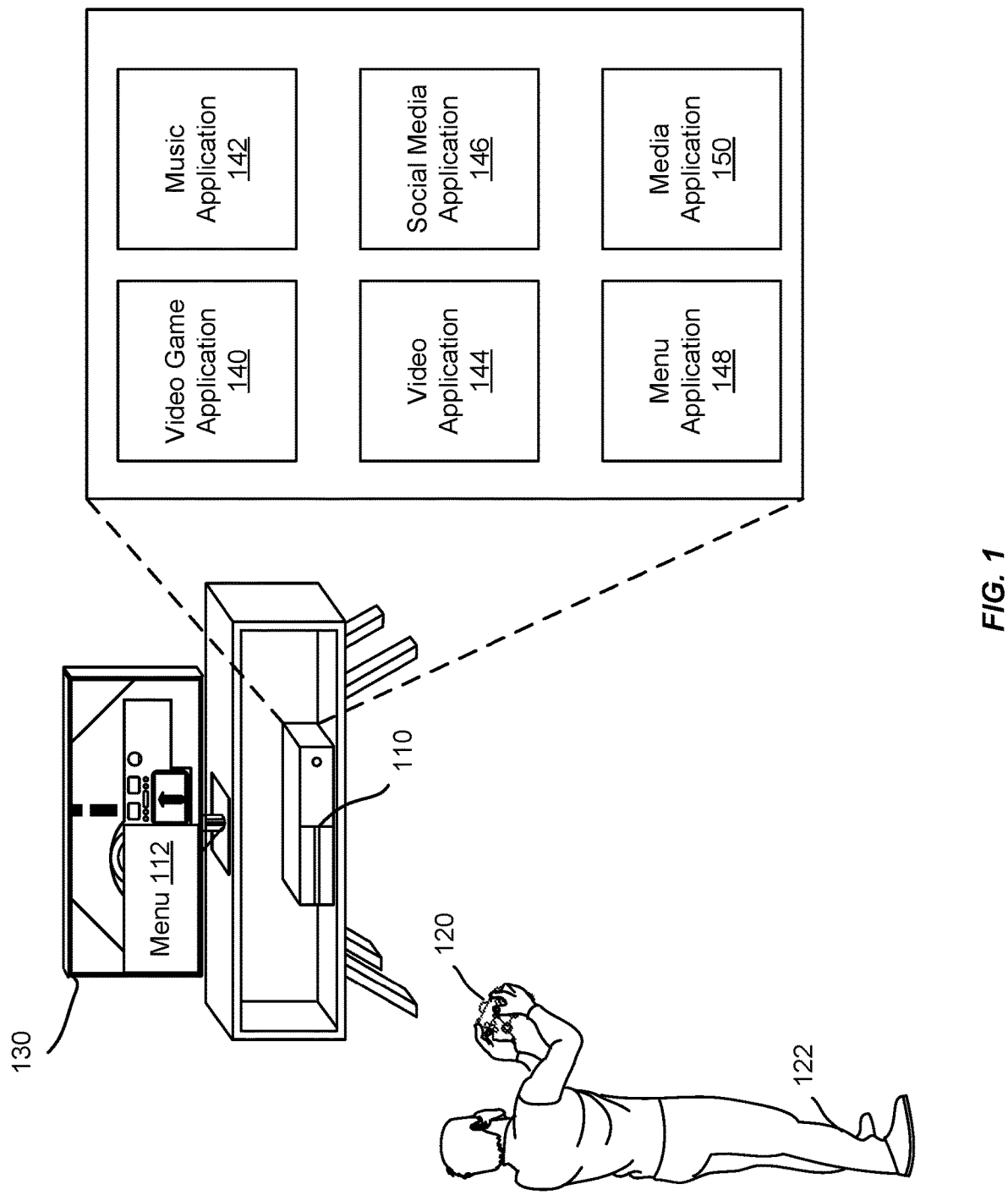
FIG. 1 illustrates a computer system that presents a menu, according to an embodiment of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Generally, systems and methods for improved content generation and navigation in a graphical user interface (GUI) are described. In an example, a computer system presents a GUI on a display. Upon an execution of a first application, first content of the first application is presented in the GUI on the display. Content files can be created in multiple forms, such as screenshots, replay video, and forward video, etc., some of which may show portions of the first content. The content files may be accessed via the window, while the first application continues to execute. The window includes control options to select, view, edit, share, etc., a content file. Once the content file is selected via a control option, the window is presented in an expanded state in the GUI on the display, providing detailed editing control options. In this way, content files can be edited, stored, and shared, through a unified GUI without navigating between multiple application menus.

Further, while the first application continues to execute, a menu is presented in a layer over at least a portion of the first content upon user input requesting the menu. The menu allows the user to preview recently captured content and to view, edit, and/or share the content all while the first application continues to execute and its content continues to be presented in the GUI (e.g., in the background of the menu). When presented, the menu can include controls to create screenshots, video clips, or replay clips. The user can select one of the options (replay, screenshot, forward video), and the media application creates and stores a corresponding content file.

To illustrate, consider an example of a video game system where a user is playing a video game application (e.g., a car racing game). Upon a user button push on a video game controller, a menu can be presented in a layer at the bottom of the display. The layer can present the menu in the foreground, while the execution of the video game application and the presentation of the video game content continue (e.g., the video game content can be updating in the background). The video game player can create a screenshot using a control in the menu and save the screenshot as a content file. The video game player can subsequently view the content file in a content gallery window, of the menu. The content gallery window can present a number of recently created content files with editing and sharing controls. When the user selects the content, the window is further expanded to show the window in the expanded state, including additional editing tools as well as a GUI configured to permit detailed editing and saving of the edited screenshot. Once created, the content file is available for the user to share with other users of the video game application.

Embodiments of the GUI described herein provide improved content generation and navigation by facilitating generation, storing, editing, and sharing of content files via a unified application interface across multiple user applications (e.g., video game applications). The media application described in more detail below provides a common set of control options to permit creation and dissemination of user-created content files for applications running on a computer system (e.g., a video game console). In conventional systems, a specialized content editing application is used to implement one or more features described below. For example, a user may first close the first application to open a content editor application, which replaces the first application on the display with a separate GUI. Once in the content editor application, the user may open a gallery, pull videos, and edit and/or share content files. Subsequently, the user may then re-open the first application to resume the first content. In contrast, embodiments described below provide an intuitive navigation GUI. For example, the first application may remain active and its first content presented in the display while the content file is viewed, edited, and shared, while the application continues to execute. In this way, navigation between applications and multiple menus may be avoided. In addition to providing seamless transitions between the first application and content file creation/editing functionality unavailable in conventional GUIs, system performance (e.g., processing and/or memory demand) may be improved, because applications may not be interrupted and/or relaunched during content editing, thereby potentially reducing computational resource usage associated with application startup processes.

In the interest of clarity of explanation, the embodiments may be described in connection with a video game system. However, the embodiments are not limited as such and similarly apply to any other type of a computer system. Generally, a computer system presents a GUI on a display. The GUI may include a home user interface from which different applications of the computer system can be launched. Upon a launch of an application, a window that corresponds to the application can be presented in the GUI. Upon a user request for a menu, a menu can be displayed over the application's window. Content files can be generated from application content automatically and/or manually, and the content included in the content files can be edited, stored, and subsequently shared with other users over a network (e.g., the internet).

In the following paragraphs, windows of the GUI that are presented as part of the menus described below are also referred to as "action cards," which are an example of a window in the context of the media application described in reference to the figures, below. An action card is an interactive GUI window that presents content and includes selectable actions that can be performed on the content and/or the action card. The action card can have different presentation states, and the content and/or actions can vary between the states. The action card presenting content of a first application (e.g., video game application) need not be a window that the first application presents. Instead, it can be a window presented by a second application (e.g., a menu application or a media application), that does not replace the first application, which can continue running. Nonetheless, the embodiments are not limited to action cards and similarly apply to any other type of windows that are usable to present content and support actions on the content.

FIG. 1 illustrates a computer system that presents a menu 112, according to an embodiment of the present disclosure. As illustrated, the computer system includes a video game console 110, a video game controller 120, and a display 130. Although not shown, the computer system may also include a backend system, such as a set of cloud servers, that is communicatively coupled with the video game console 110. The video game console 110 is communicatively coupled with the video game controller 120 (e.g., over a wireless network) and with the display 130 (e.g., over a communications bus). A video game player 122 operates the video game controller 120 to interact with the video game console 110. These interactions may include playing a video game presented on the display 130, interacting with a menu 112 presented on the display 130, and interacting with other applications of the video game console 110.

The video game console 110 includes a processor and a memory (e.g., a non-transitory computer-readable storage medium) storing computer-readable instructions that can be executed by the processor and that, upon execution by the processor, cause the video game console 110 to perform operations that relates to various applications. In particular, the computer-readable instructions can correspond to the various applications of the video game console 110 including a video game application 140, a music application 142, a video application 144, a social media application 146, a menu application 148, a media application 150, among other applications of the video game console 110 (e.g., a home user interface (UI) application that presents a home page on the display 130).

The video game controller 120 is an example of an input device. Other types of the input device are possible including, a keyboard, a touchscreen, a touchpad, a mouse, an optical system, a microphone, or other user devices suitable for receiving input of a user.

Upon an execution of the video game application 140, a rendering process of the video game console 110 presents video game content (e.g., illustrated as car driving video game content) on the display 130. Upon user input from the video game controller 120 (e.g., a user push of a particular key or button), the rendering process also presents the menu 112 based on an execution of the menu application 148. The menu 112 is presented in a layer over the video game content and includes one or more interactive areas, as described in more detail, below. Windows in the interactive areas may correspond to a subset of the applications of the video game console. Among the windows, the media application 150 may generate and/or present on the display an action card presenting recently captured content files in an interactive gallery. The media application 150 provides access to content file creation, editing, and sharing functionality via the menu 112, rather than, for example, through a dedicated content editor application.

Upon the presentation of the menu 112, the user control changes from the video game application 140 to the media application 150. Upon receiving user input from the video game controller 120 requesting interactions with the menu 112, the media application 150 supports such interactions by updating the menu 112 and launching any relevant application in the background or foreground. Upon the exiting of the menu 112 or the dismissal based on a background application launch, the user control changes from the media application 150 to the video game application 140, while one or more features of the media application 150 may operate without user control.

The media application 150 includes an event detection service, as described in more detail in reference to FIG. 7, below. The event detection service identifies activity in the media content that is likely to be of interest to the user of the video game application, based, for example, on metadata associated with an event in the video game application. Media content is then cached by the media application 150 and used to generate shareable content files that are stored for future reference by the user of the video game console 110.

Although FIG. 1 illustrates that the different applications are executed on the video game console 110, the embodiments of the present disclosure are not limited as such. Instead, the applications can be executed on the backend system (e.g., the cloud servers) and/or their execution can be distributed between the video game console 110 and the backend system.

Figure 2:
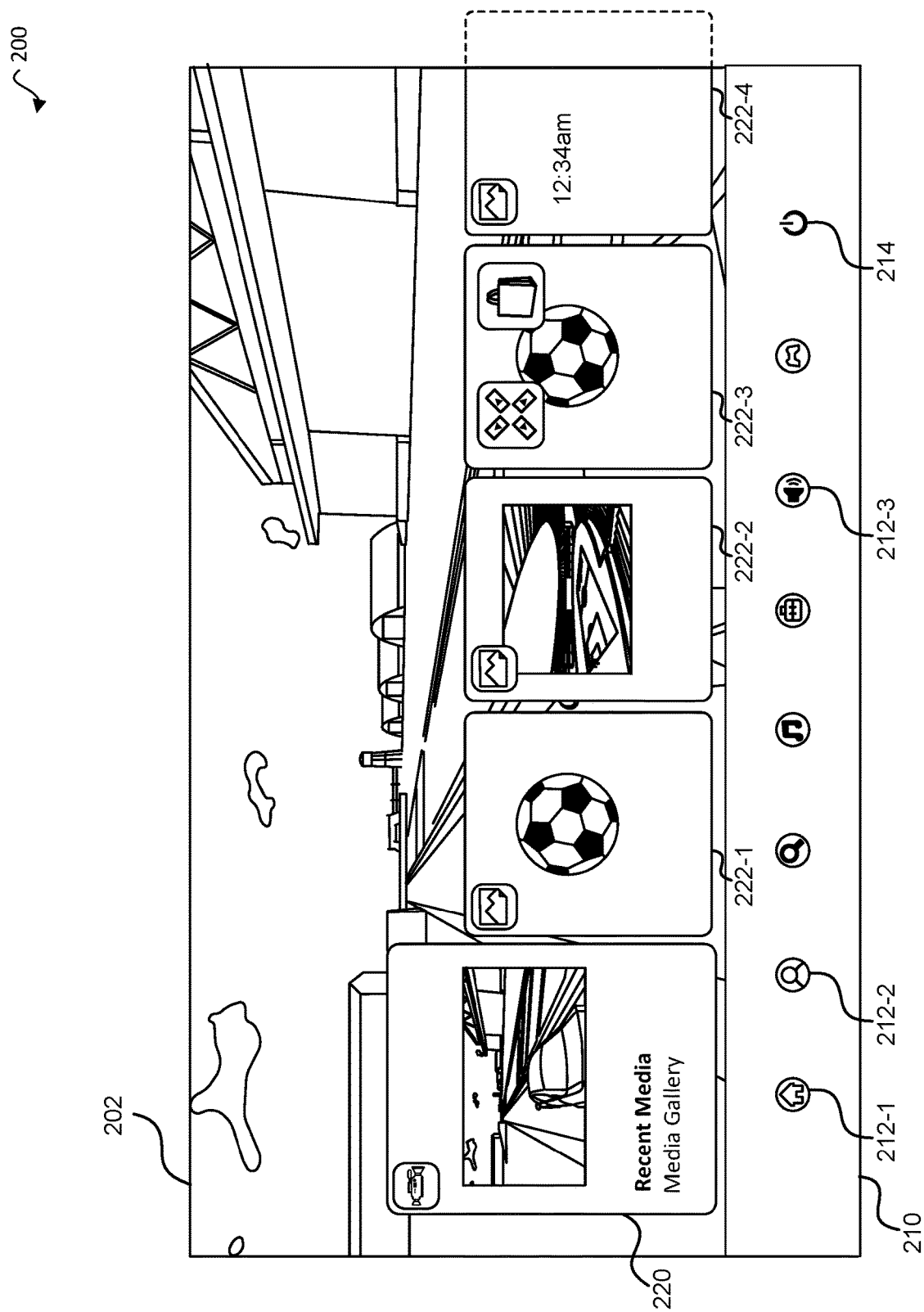
FIG. 2 illustrates an example of a menu presenting multiple action cards, according to embodiments of the present disclosure.

FIG. 2 illustrates an example of a menu 200 presenting multiple action cards, according to embodiments of the present disclosure. In some embodiments, the menu 200 is presented as at least a partial overlay on application content 202 (e.g., video game content). The menu 200 includes a control panel 210 including one or more interactive icons 212 linked to system and/or user applications of the computer system (e.g., video game console 110 of FIG. 1). As an example, the interactive icons 212 may include a first interactive icon 212-1 as a home button, which may link the menu 200 to a home application (e.g., a console browser application, a root menu, etc.), and may permit a user of the computer system to navigate from the menu 200 to the home application. Similarly, the interactive icons 212 may include a second interactive icon 212-2 linked to a user profile and/or a content sharing platform app (e.g., social media application 146 of FIG. 1), as described in more detail in reference to FIG. 12. In another example, a third interactive icon 212-3 may link to a system controls application (e.g., a sound level application) providing controls for one or more system parameters (e.g., gameplay, display, sound, etc.). In some embodiments, the control panel 210 may also include a session control icon 214, permitting the user to end an application session (e.g., log out, quit, exit, etc.).

While the menu 200 is shown as overlaying the bottom region of the application content 202, it may be positioned in additional and/or alternative manners including, but not limited to, side and/or top regions of the application content 202, as well as in a floating central window, as an action card 222, or by resizing the application content 202 to fit both the application content 202 and the menu 200 on a display (e.g., display 130 of FIG. 1).

In some embodiments, the menu 200 includes the action card 220 and multiple action cards 222. One or more of the action cards 222, including the action card 220, may be visually emphasized (e.g., by presentation in the menu 200 at a larger size). As such, the menu 200 includes the action cards 222 and the action card 220 in the glanced state, providing information by which the user of the menu 200 may be able to identify the function of each of the action cards 222. In some embodiments, the action cards 222 and the action card 220 include images, text, and/or dynamic elements to indicate the association of the action cards 222 with an application of the computer system. For example, the action card 220 may include an image, a badge, text, etc., to identify the card with a media application (e.g., media application 150 of FIG. 1). Similarly, a first action card 222-1 may identify a video game application (e.g., a soccer game) that is different from the application represented by the application content 202. In some embodiments, a second action card 222-2 may link to a streaming content application (e.g., a media platform application) that may be indicated by an image (e.g., a thumbnail) of a content stream and/or a clip including motion picture content generated from the content stream. In some embodiments, a third action card 222-3 can be a multi-tasking card, which may include functionality from multiple applications (e.g., an online game browser, an online game store, linked to an application). In some embodiments, a fourth action card 222-4 can be a system utility card, which may present one or more system tools (e.g., a clock, a weather applet, stock ticker). Similarly, the action cards 222 may be linked to social media feeds, news applications, television networks, etc.

In some embodiments, the arrangement and composition of the action cards 222 may be determined and populated automatically. For example, the action cards 222 may be selected based on recent activity and/or interaction with the linked application. In some embodiments, one or more action cards 222 may be included by default in the menu 200. In some embodiments, action cards 222 may be added or removed from the menu 200 by a user configuration (e.g., through accessing a configuration menu via an interactive icon 212 of the control panel 210). In some embodiments, the action cards 222 are arranged in a scrollable horizontal sequence that can be shifted from side to side via an interaction with the menu 200 (e.g., through a controller interaction by the user). As shown in FIG. 2, action cards 222 that extend beyond the edge of the application content 202 (e.g., coinciding with the edge of the display) may be partially shown. As illustrated in the menu 200, the action card 220 may be emphasized when new media content is available for recent application content 202. For example, the action cards 222, including the action card 220, may be arranged in the menu 200 in order of recency (e.g., in order of recent content added for the respective associated application).

When selected, the action card 220 may expand from a glanced state to a focused state, such that additional control options are presented in context with the type of content presented. As described in more detail below, the additional control options may include content editing and/or sharing utilities provided by the media application (e.g., media application 150 of FIG. 1). Upon selection of an editing control option, the action card may be presented in an expanded state, including additional editing controls corresponding to the type of content file and/or the application being presented. For example, some editing controls may be authorized and/or excluded by the underlying application (e.g., video game application), such that the action card may present application-specific editing controls.

Figure 3:
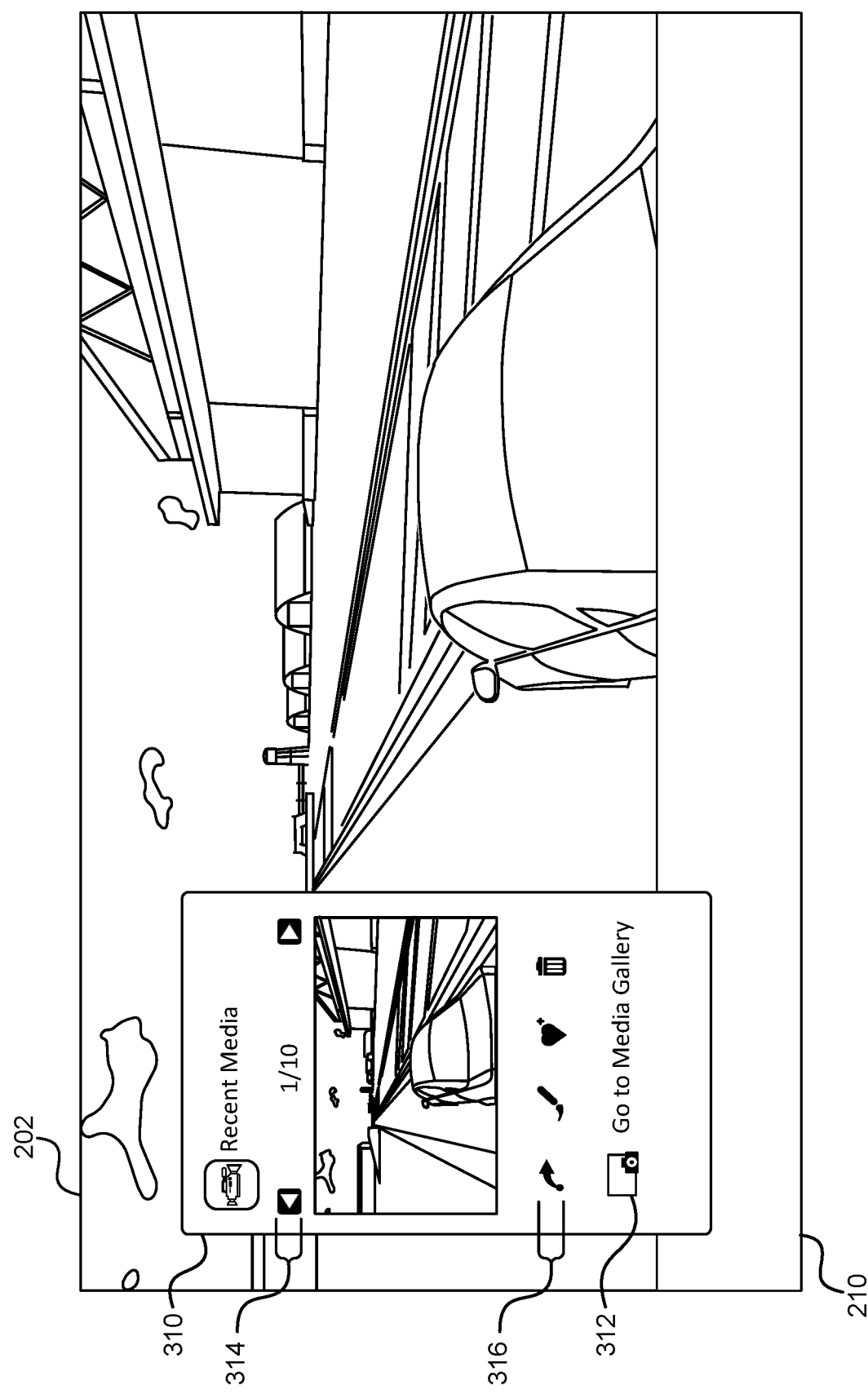
FIG. 3 illustrates an example of an action card in a focused state, according to embodiments of the present disclosure.

FIG. 3 illustrates an example of an action card 310 in a focused state, according to embodiments of the present disclosure. The action card 310 may transition from the emphasized-glanced state (e.g., action card 220 of FIG. 2), to the focused state in response to user input (e.g., a button push using the controller 120 of FIG. 1) to select the action card 310 in the glanced state. In response to the user input, the menu (e.g., the menu 200 of FIG. 2) may hide elements of the menu including, but not limited to, elements of the control panel, and non-selected action cards (e.g., action cards 222 of FIG. 2). As illustrated in FIG. 3, entering the focused state for the action card 310 may remove other elements of the menu, while the application content 202 continues beneath the menu. As described below, accessing the action card from the menu 200 is one ingress approach, while other ingress approaches may be available (e.g., via user interaction with a controller or via different menus).

In the focused state, the action card 310 includes one or more interactive user interface elements including a gallery link 312 to launch the media application (e.g., media application 150 of FIG. 1) and/or to transition the action card 310 to an expanded view, as described in more detail in reference to FIG. 4, below. Additionally, the action card 310 may include an interactive gallery control 314 to present one or more content files (e.g., thumbnails, screenshots, video previews) that are available for editing by the user of the menu. In some embodiments, a user interaction with the gallery control 314 may cycle between the one or more content files presented in the action card 310, which may be arranged in order of recency. For example, the first content file presented in the action card 310 may be the most recently generated content file.

The number of content files presented in the action card 310 may be configured by the user and/or may be an application parameter of the media application. In some embodiments, the number of content files presented in the action card 310 may be the total number of files associated with the application (e.g., the video game application) that have been generated by the user and/or by the application. In some embodiments, the total number of content files presented in the action card 310 may be limited to the number of content files created within a period of time preceding the presentation of the action card 310 (e.g., content files created within the preceding twenty-four hours, preceding week, etc.). In some embodiments, the action card 310 may also include one or more editing controls 316 and/or other controls (e.g., share, edit, social media, delete controls, etc.). When an editing control 316 is selected, the action card 310 may transition to an expanded state, as described in more detail in reference to FIG. 4, below.

In general, such techniques improve responsiveness of the GUI, by identifying and generating content files automatically (e.g., without user interaction), such that content files are available immediately upon request from the menu. Furthermore, perceived latency in menu presentation, especially between presentation states, is reduced by providing a first presentation state (the focused state) between a third presentation state presenting limited data and a second presentation state presenting detailed data. The second presentation state imparts a more seamless and fluid interaction with the menu by focusing system resources on only one application menu, and preventing rapid scrolling through windows in the first or second presentation states (the focused state and the expanded state, respectively). Additionally, implementing multiple presentation states may reduce demand on system resources imposed by the media application by only launching functionality of editing and content presentation when a user intentionally selects editing tools. In this way, the media application populates focused and expanded states only as-needed.

Figure 4:
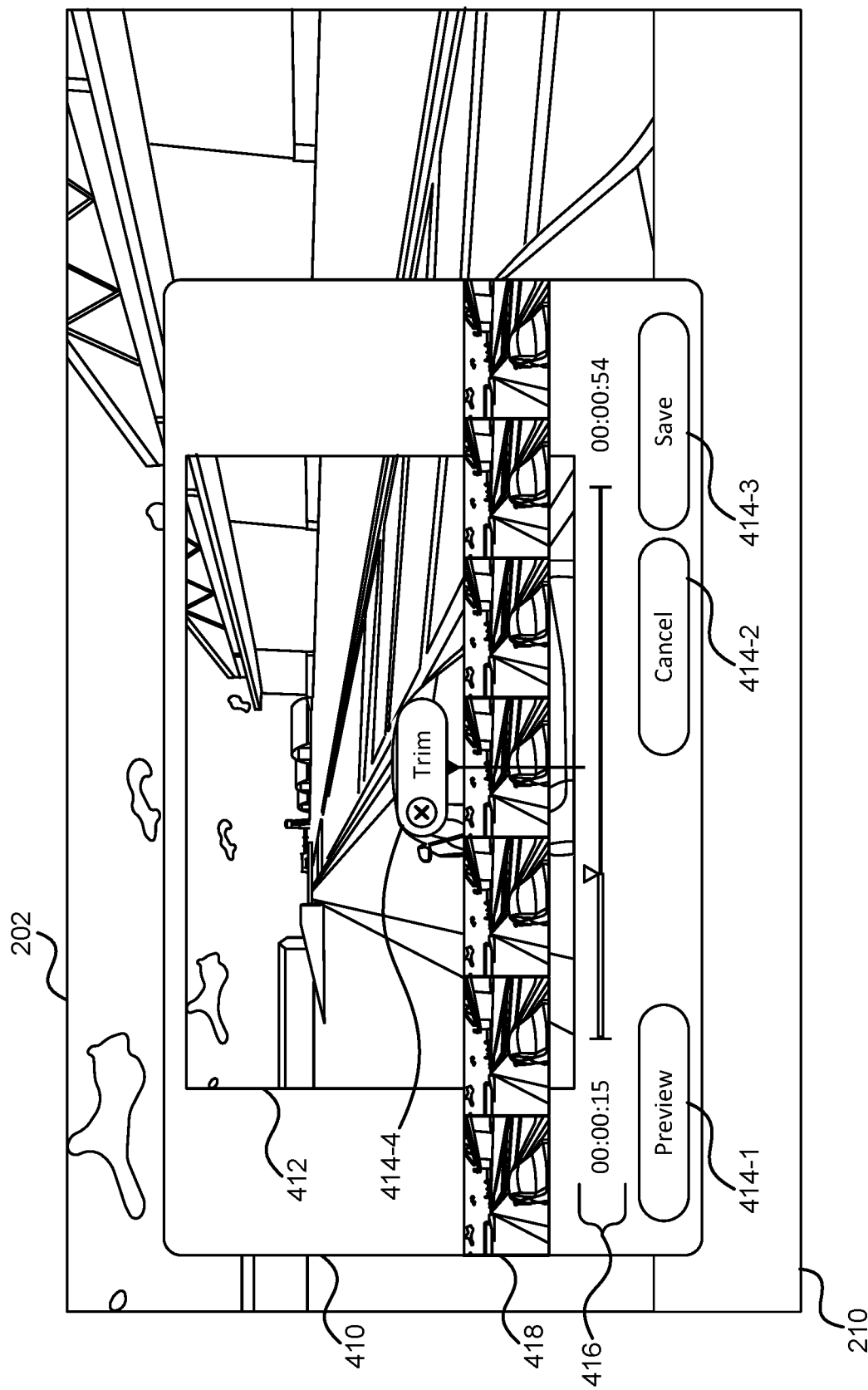
FIG. 4 illustrates an example of an action card in an expanded state, according to embodiments of the present disclosure.

FIG. 4 illustrates an example of an action card 410 in an expanded state, according to embodiments of the present disclosure. The action card 410 can be the expanded state (e.g., the second presentation state) presentation of the action card (e.g., action card 220 of FIG. 2). In the expanded state, the action card 410 presents an editing interface for the content 412 selected from the action card in the focused state (e.g., action card 310 of FIG. 3). In the example illustrated, the content 412 is a video clip captured from application content 202 (e.g., gameplay content of a video game application).

The editing interface may include one or more controls 414 facilitating the editing of the content 412. For example, a first control 414-1 may permit edits made to the content 412 to be previewed before finalizing the edits. In some cases, edits may be canceled or finalized by a second control 414-2 and a third control 414-3, respectively. In some embodiments, the third control 414-3 may be a save button that may store the content 412 with any edits made to the content 412 via the action card 410. Storing the content 412 may include storing a file containing the content 412 on a storage medium of the computer system (e.g., memory of the video game console 110 of FIG. 1), and/or storing the file on an online storage system (e.g., cloud storage) linked to a user account of the user of the application (e.g., the video game application).

In some embodiments, the editing interface may include additional video clip editing and/or playback controls, including, but not limited to, a tracking bar 416 and/or a scrubbing viewer 418. A fourth control 414-4, may facilitate editing the length, starting point, stopping point, etc., of the content 412 (e.g., a "trim" control to define the end point of the video clip). The fourth control, being coupled to the stage of editing, may be a dynamic graphical element that changes in relation to the command it implements. For example, the first use of the fourth control may be to set a start point, the second to set an endpoint, and the third to trim the outside extents of the content 412.

In some cases, the additional video clip editing and/or playback controls include adding text, images, or other features into the content 412. For example, text captions and/or graphics may be superimposed on the content 412 for a duration of time (e.g., a number of frames). In cases where the content 412 is an image, additional controls may include photo editing tools including, but not limited to, cropping, color correction, focus manipulation, zoom and re-center, captioning, etc.

When editing of the content file concludes, the content file may be stored in a content gallery containing recently captured content. The content gallery can be a folder that stores the different content files that may be created from application content (e.g., application content 202 of FIG. 2), and may be presented in via the action card 220 of FIG. 2, the action card 310 of FIG. 3, and/or the action card 410 (e.g., glanced state, focused state, and expanded state). Following the completion of editing in the action card 410, the GUI may transition in one or more ways. In some embodiments, the action card 410 may transition from the expanded state to the focused state (e.g., action card 310 of FIG. 3). In some embodiments, the action card 410 may be removed from the GUI altogether, and user control may switch to the application (e.g., video game application). In some embodiments, the GUI may surface a menu configured for content creation, as described in more detail in reference to the forthcoming figures. In some embodiments, the action card 410, presenting the content file most recently created, may be presented in the glanced state in the menu configured for content creation, as described in more detail in reference to FIG. 11, below.

Figure 5:
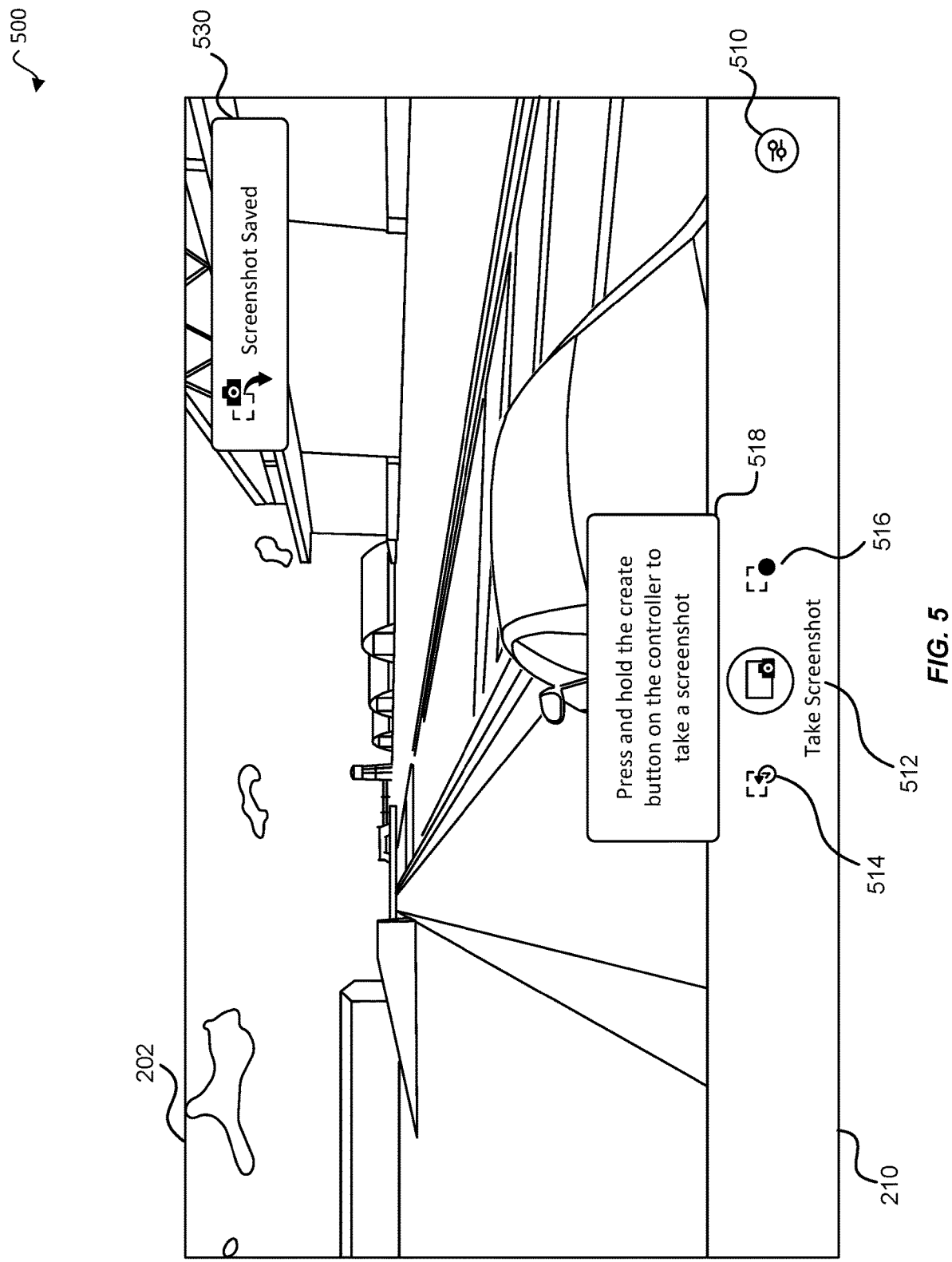
FIG. 5 illustrates an example of a content generation menu for capturing a screenshot of content, according to embodiments of the present disclosure.

FIG. 5 illustrates an example of a content generation menu 500 for capturing a screenshot of content, according to embodiments of the present disclosure. The application content 202 may be captured by the media application (e.g., media application 150 of FIG. 1) to generate shareable content in multiple ways. In some cases, the content may be generated manually while the application is running, for example, by accessing the menu 500.

In some embodiments, the menu 500 may include the control panel 210 overlaying at least a portion of the application content 202. The control panel 210 may include, in addition or alternative to interactive icons (e.g., interactive icons 212 of FIG. 2), content generation controls for different types of content. For example, the control panel 210 may include a parameter control 510, as described in more detail in reference to FIG. 8, below. A screenshot control 512 may permit the manual capture of a screenshot, where the screenshot may register the instantaneous view presented in the application content 202 (e.g., the player-view of the video game application being presented on the display). In some embodiments, the control panel 210 may also include a replay clip control 514 and a video clip control 516, as described in more detail in the paragraphs, below.

A graphical element 518 may be presented in the menu 500, for example, as a partial overlay of the control panel 210 and/or the application content 202. The graphical element 518 may provide instructions and/or help to guide the user to generate content (e.g., commands on a user interface device, such as a controller). The menu 500 may also include a confirmation message 530 that may include graphics and/or text, to confirm that the screenshot was generated and/or saved. Saving, as described above, may include storing the content file in on-device memory and/or over a networked storage system (e.g., cloud storage). When a content file is stored, it can be accessible from the content gallery that organizes the content file and other stored content files based on their respective recencies. Upon accessing the content file, this file can be viewed in an action card (e.g., action card 220 of FIG. 1). The action card, as described above, may present a number of content files representing, for example, recently captured application content 202.

Figure 6:
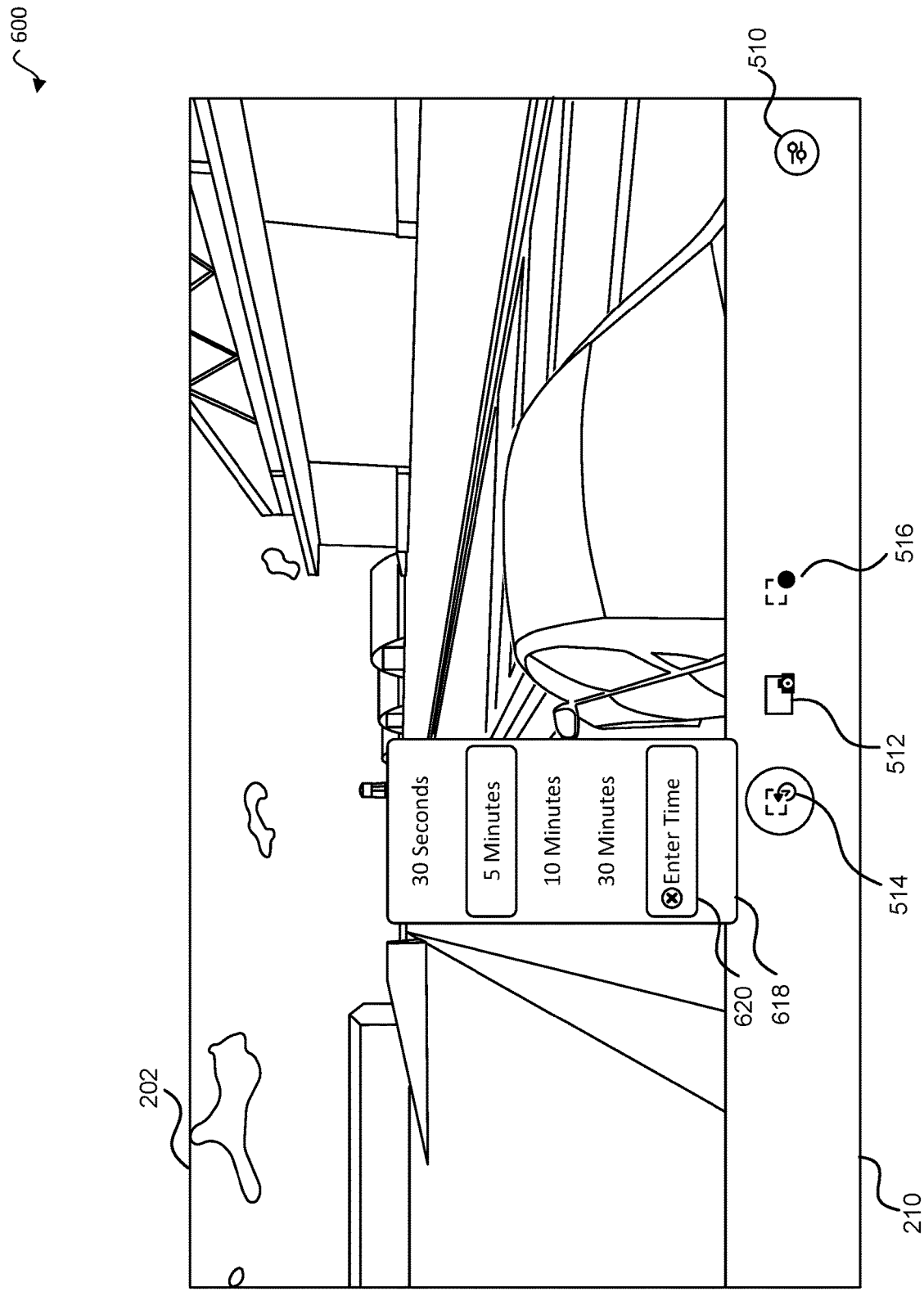
FIG. 6 illustrates an example of a configuration submenu of a content generation menu for generating a video content file, according to embodiments of the present disclosure.

FIG. 6 illustrates an example of a configuration submenu 618 of a content generation menu 600 for generating a video content file, according to embodiments of the present disclosure. As part of using the replay clip control 514 of the control panel 210, a user may access the configuration submenu 618, which may provide one or more options for selecting a time length of the application content 202 to save. In some embodiments, the media application (e.g., media application 150 of FIG. 1) may temporarily store (e.g., in a ring buffer), video data corresponding to the application content 202 (e.g., video game content). In this way, the media application may generate a replay clip of the desired length when the replay clip command 514 is used. In some embodiments, the configuration submenu 618 includes one or more set selectable time lengths for the replay clip. The configuration submenu 618 may also include an editable text entry box 620 that may be configured to receive integer time lengths (e.g., in minutes or seconds), or fractional and/or decimal time lengths (e.g. decimal minutes).

In some embodiments, the ring buffer continuously stores video frames of the application content 202 corresponding to a period of time, based on file parameters including, but not limited to, framerate, frame resolution, etc. (e.g., one hour—depending on the ring buffer size and video resolution and framerate). In this way, the media application may retrieve the appropriate number of video frames from the ring buffer, corresponding to the selected time length from the configuration submenu 618, and may store the retrieved frames as a recently captured video file in the content gallery. As described above, the content gallery may store content files for presentation in action cards (e.g., action card 220 of FIG. 2) to facilitate editing, storing, and/or sharing of content files.

Figure 7:
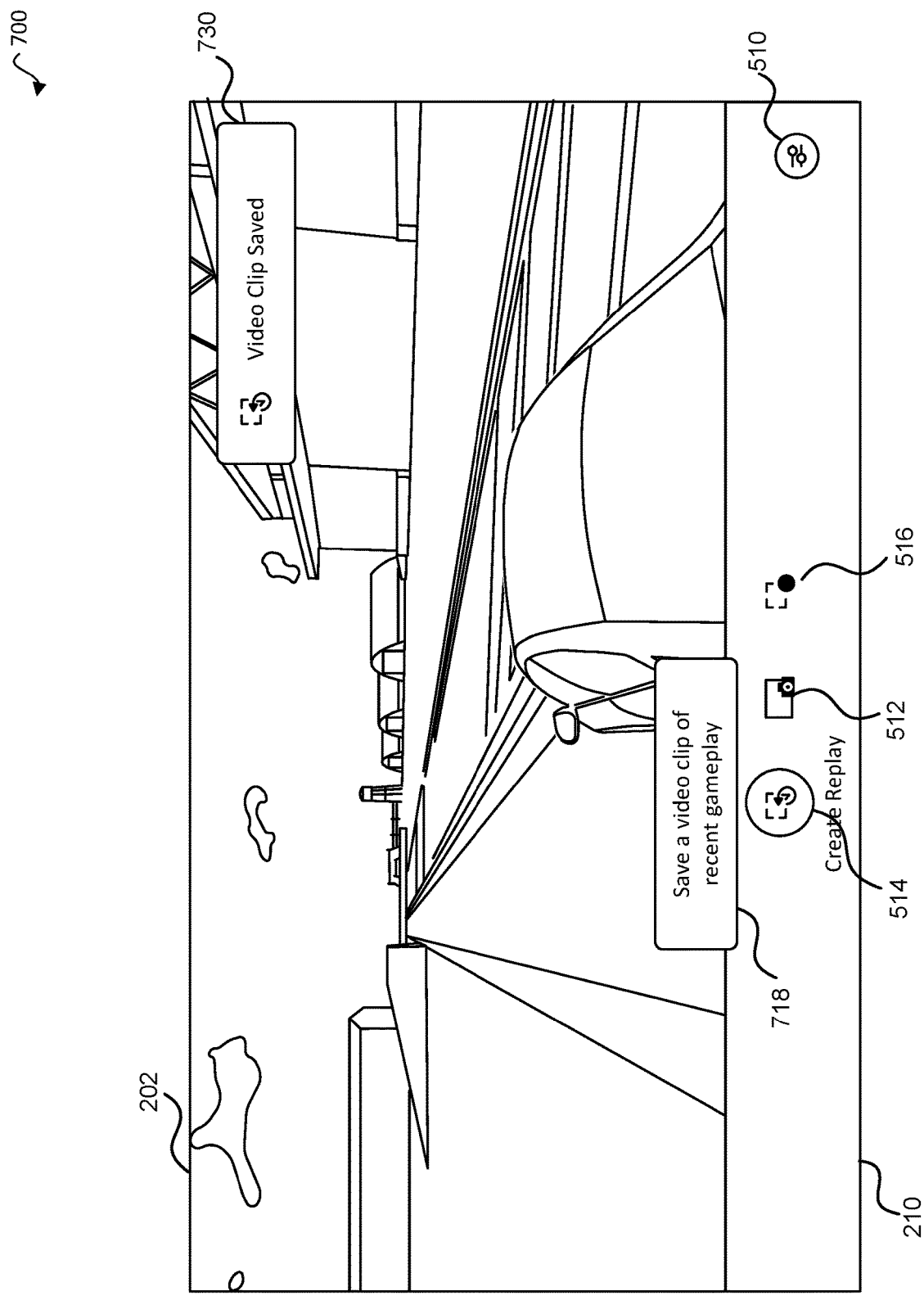
FIG. 7 illustrates an example of a content generation menu for generating a video content file, according to embodiments of the present disclosure.

FIG. 7 illustrates an example of a content generation menu 700 for generating a video content file, according to embodiments of the present disclosure. When a time length has been selected, for example, using the configuration submenu (e.g., configuration submenu 618 of FIG. 6), creating a replay clip of the application content 202 may be facilitated via the replay clip control 514.

In some embodiments, generating the replay clip may include generating a file encoding the replay clip (e.g., in a compressed format optimized for sharing over a network). To generate the replay clip, the media application (e.g., media application 150 of FIG. 1) may retrieve the most recent (e.g., latest) video data corresponding to the time length selected via the configuration submenu 618. Similar to capturing a screenshot via the screenshot command 512, the menu 700 may present a graphical element 730 including graphics and/or text to indicate that the replay clip has been created and/or saved. Furthermore, a different graphical element 718 including instructions or guidance (e.g., by text and/or images) may be included as part of the menu 700, to help the user create the replay clip, for example, by providing alternative controls or instructions on navigating the configuration submenu.

In addition, the media application may automatically (e.g., without manual interaction and/or control) identify when the application content 202 (e.g. video game content) includes an event within the content (e.g., a gameplay event). Events may be identified in one or more ways, including, but not limited to, metadata indicating a challenging feature of the application, a number of repeated attempts by the user to achieve a given result, direct configuration of the media application to record the application content 202 at a specified time (e.g., a boss fight), etc. In some embodiments, when the media application identifies the event, it may also identify a start and an end of the event, and may retrieve from temporary storage a replay clip corresponding to the application content 202 stored in temporary storage between the start and end of the event. The graphical element 730 may be similarly presented when a replay clip is generated automatically, to notify the user that a replay clip has been generated. In some embodiments, this automatically generated video file based on the detected event also may be automatically stored in the content gallery of recently captured content and becomes one of the video files that can be previewed, viewed, edited, shared, etc., via an action card, as described in reference to FIGS. 3-4, above.

Figure 8:
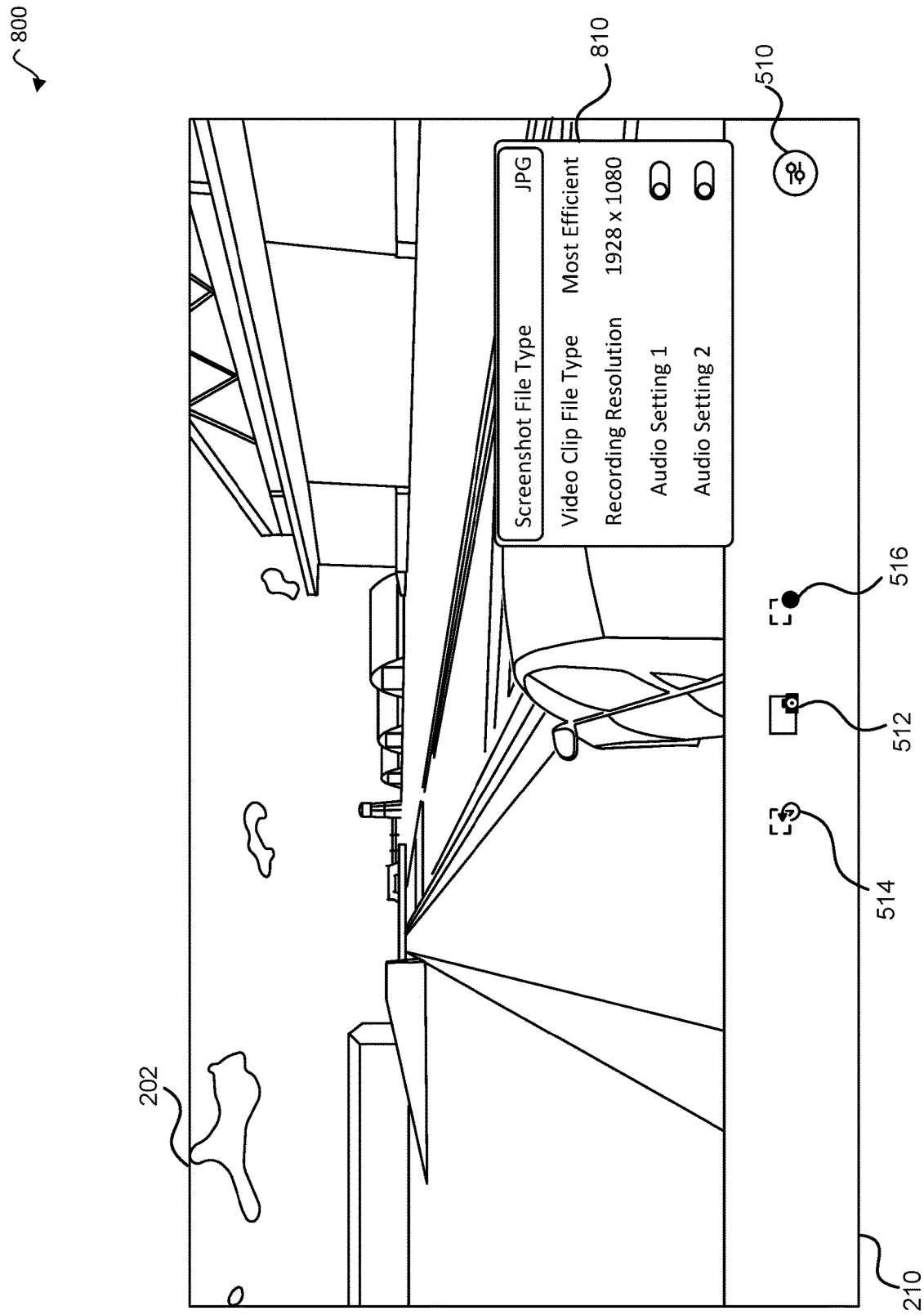
FIG. 8 illustrates an example of a parameter submenu of a content generation menu, according to embodiments of the present disclosure.

FIG. 8 illustrates an example of a parameter submenu 810 of a content generation menu 800, according to embodiments of the present disclosure. In addition to providing the control panel 210 and one or more content file creation controls, the menu 800 may include additional controls providing selectable options to permit the user of the media application (e.g., video game player 122 of FIG. 1) to select aspects of the content file being generated.

In some embodiments, the menu 800 includes a file parameter sub-menu 810, which may permit the user of the media application to configure one or more aspects of the content files including, but not limited to, selecting a type of the content file, selecting a resolution of the video of the content file, including audio data generated by a microphone coupled with the computer system, or including audio data received from other computer systems. When generating content files, the media applications may implement the configuration parameters implemented via the parameter submenu 810. In some embodiments, the user may surface the parameter submenu via the parameter control 510.

In an example, the screenshot control 512, when selected, may cause the media application to generate a screenshot according to the file type, compression, resolution, etc., selected in the parameter submenu 810. Similarly, the parameter submenu 810 may include corresponding file types, resolutions, and compression options for video clips for the replay clip control 514 and the video clip control 516. In this way, the content files may be available for subsequent presentation and editing in corresponding sizes and resolutions, via the action cards described above.

Figure 9:
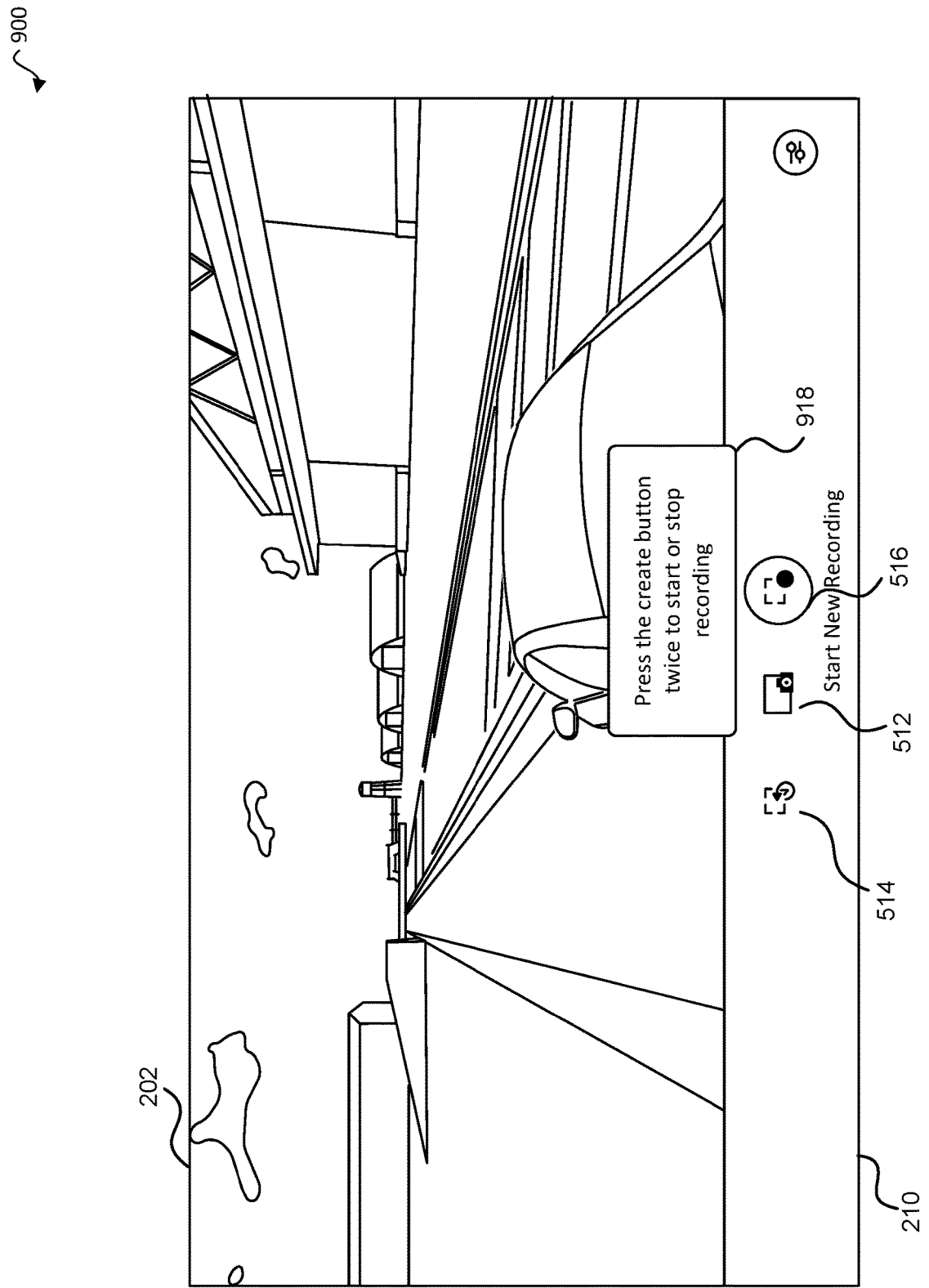
FIG. 9 illustrates an example of a content generation menu for recording a video content file, according to embodiments of the present disclosure.

FIG. 9 illustrates an example of a content generation menu 900 for recording a video content file, according to embodiments of the present disclosure. As described above, video clip files may be generated by the media application in response to manual user input, for example, by selecting the video clip control 516 of the control panel 210. In some cases, doing so may start recording the application content 202. The recording may be configured according to parameters as described in more detail in reference to FIG. 8.

In some embodiments, the menu includes a graphical element 918 to provide guidance and/or instructions to the user (e.g., video game player 122 of FIG. 1) to use additional and/or alternative approaches to generate content files. For example, additional techniques may be used to start and/or stop recording a video clip. In some embodiments, a user interface device (e.g., controller 120 of FIG. 1) may include a button for which the media application is configured to start and stop recording in response to a user action associated with the button (e.g., a "create" button). For example, pressing the button twice may start and stop the process of recording the video clip. In some embodiments, different combinations of buttons and types of interactions may permit directly generating content files without navigating to the control panel 210. For example, a multi-button selection or a button hold may trigger the creation of a screenshot, while a single button selection or a button hold may trigger the start and stop of video clip recording.

Figure 10:
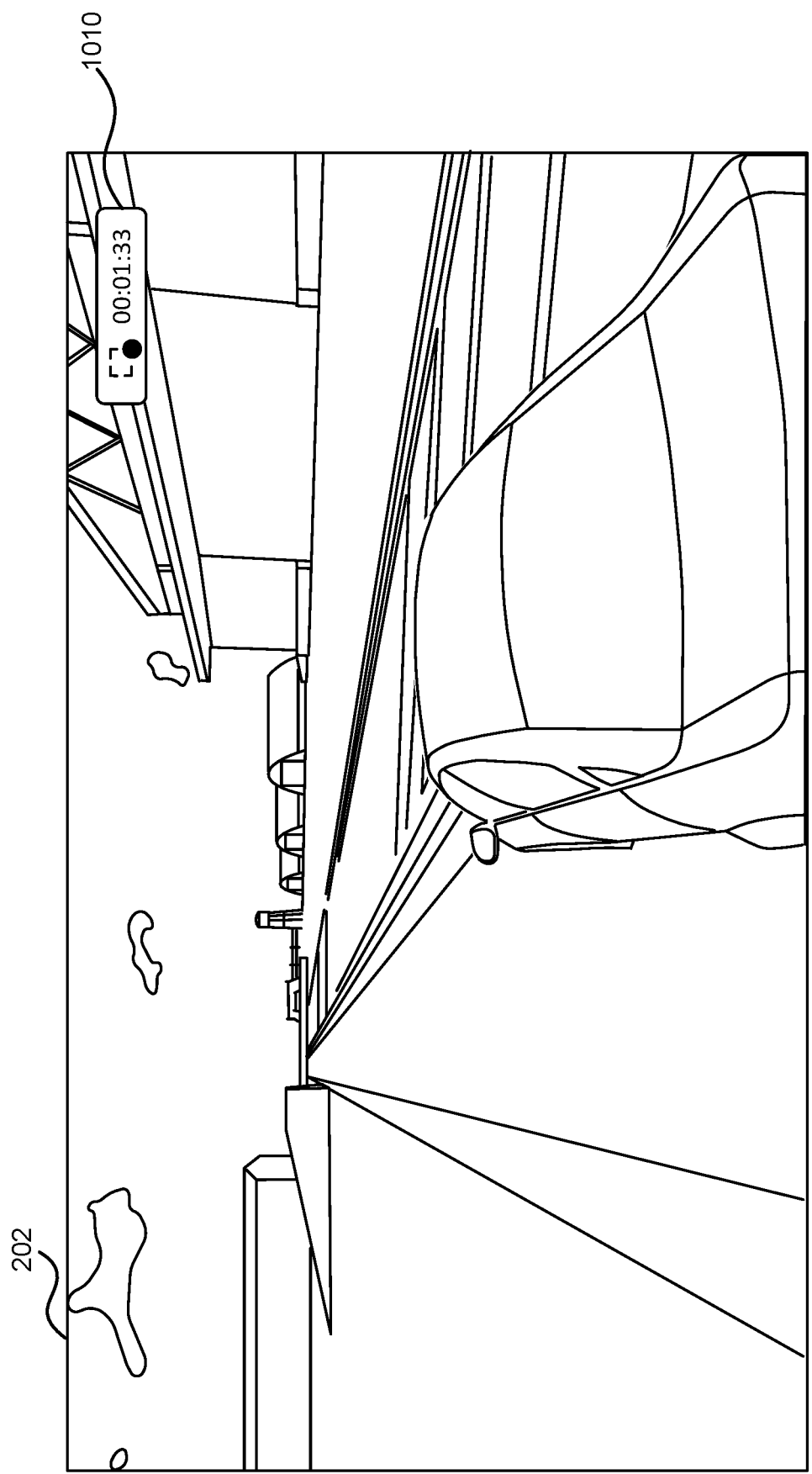
FIG. 10 illustrates an example of recording a video content file during presentation of video content, according to embodiments of the present disclosure.

FIG. 10 illustrates an example of recording a video content file during presentation of application content, according to embodiments of the present disclosure. As described above, the media application (e.g., media application 150 of FIG. 1) may permit the user of an application (e.g., a video game application) that is presenting application content 202 on a display (e.g., display 130 of FIG. 1) to record the application content 202 and generate a video clip file. In some embodiments, the media application may remove, hide, or otherwise minimize the appearance of the menu (e.g., menu 200 of FIG. 2) from the display, returning to full screen presentation of the application content 202.

In some embodiments, the media application may generate and/or present a graphical element 1010 as an overlay on the application content 202. The graphical element 1010 may include dynamic elements (e.g., images and text) to indicate the length of time elapsed during recording, such as, for example, a chronometer showing the length of the recorded clip.

In some embodiments, the recording may be streamed live over a network to one or more viewers (e.g., using a chat function or online streaming platform), for which the graphical element 1010 may include one or more indications of viewer reactions (e.g., text and/or images) that may be presented at least partially overlaid on the application content 202 or within the graphical element 1010. In some embodiments, application content 202 can be captured for use in creating content files by other means. For example, direct control sequences using one or more buttons, types of button activations (e.g., double click, click and hold, etc.), gestures via a touch screen device, speech input at a microphone, and/or one or more other types of user interaction devices may permit the content file to be generated without navigation through the menus described in preceding paragraphs. For example, the GUI illustrated in FIG. 10 may be generated and/or presented in response to a button combination while control is maintained on the application (e.g., the video application), such that the video file is recorded without generation and/or presentation of a control panel (e.g., control panel 210 of FIG. 2). In some embodiments, the GUIs can provide hints/suggestions/explanations about how to directly create content files without switching user control from the application to the control panel (e.g., via graphical element 518 of FIG. 5).

Figure 11:
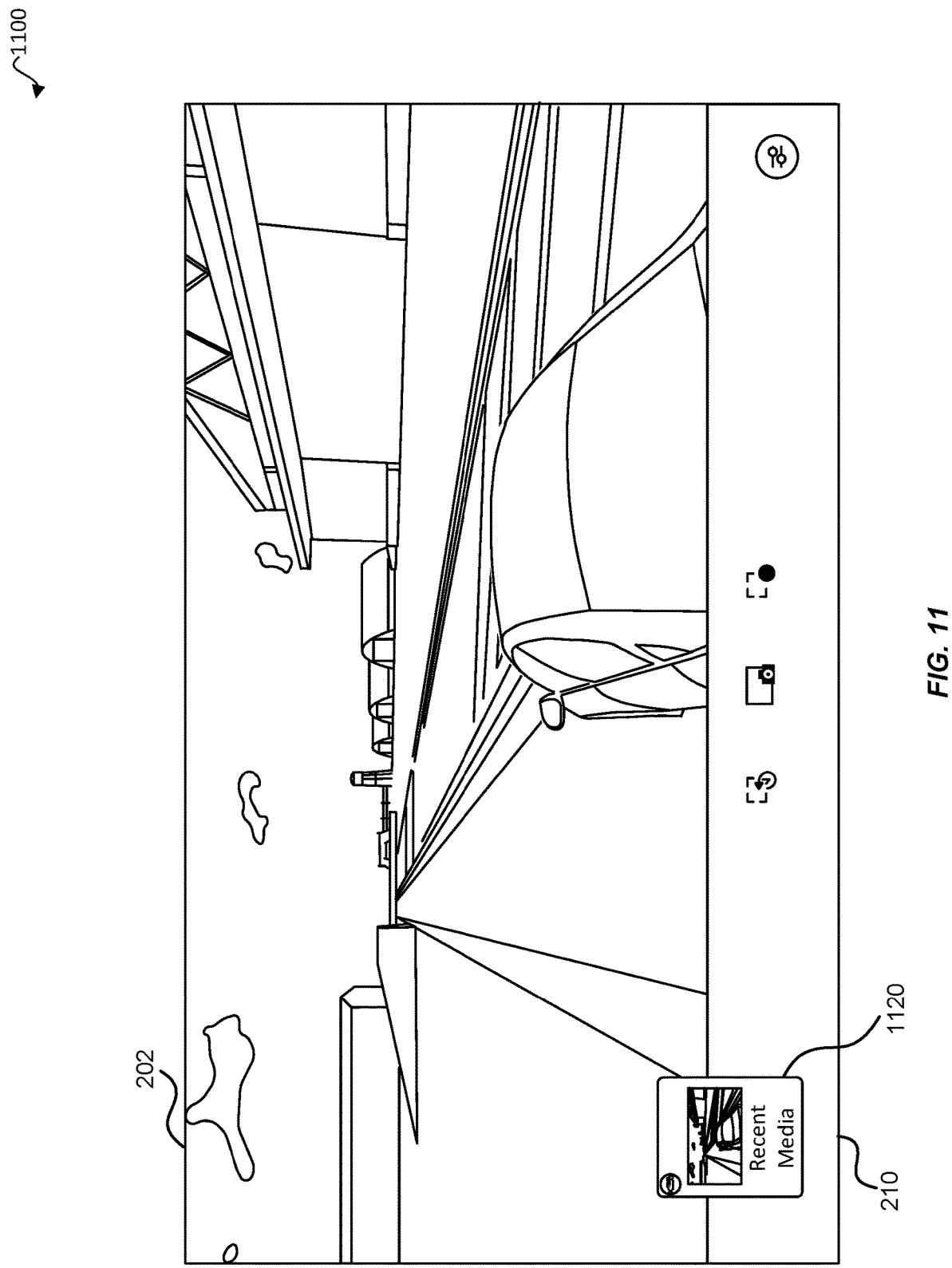
FIG. 11 illustrates an example of an action card presented in a content generation menu, according to embodiments of the present disclosure.

FIG. 11 illustrates an example of an action card 1120 presented in a content generation menu 1100, according to embodiments of the present disclosure. Following the generation of a content file, the media application (e.g., media application 150 of FIG. 1) may generate and/or present the action card 1120 as a partial overlay of the control panel 210 and/or the application content 202. In some embodiments, the action card 1120 may be the most recently generated content file presented in an action card in the glanced state (e.g., action card 222 of FIG. 2). The action card 1120 may provide an avenue to access the control panel (e.g., control panel 210 of FIG. 2), as one possible avenue of ingress for the action card (e.g., action card 220 of FIG. 2). Other possible avenues of ingress to content editing functionalities (e.g., action card 310 of FIG. 3, action card 410 of FIG. 4) include, but are not limited to a user interaction (e.g., a button press, combination, or sequence of button activation, a gesture, a speech input, etc.) to invoke the action card. For example, the system (e.g., console 110 of FIG. 1) may receive a voice command to surface recently captured content (e.g., "computer, show replay card"), in response to which media application (e.g., media application 140 of FIG. 1) may surface the action card (e.g., action card 220 of FIG. 2).

The action card 1120 may be interactive and selectable using one or more navigation techniques. For example, the action card 1120 may be directly accessed by a button press or a combination of button presses by the user (e.g., via controller 120 of FIG. 1). The media application may generate and/or present an action card in the focused state, as described in more detail in reference to FIG. 3, in response to selection of the action card 1120 by the user.

Figure 12:
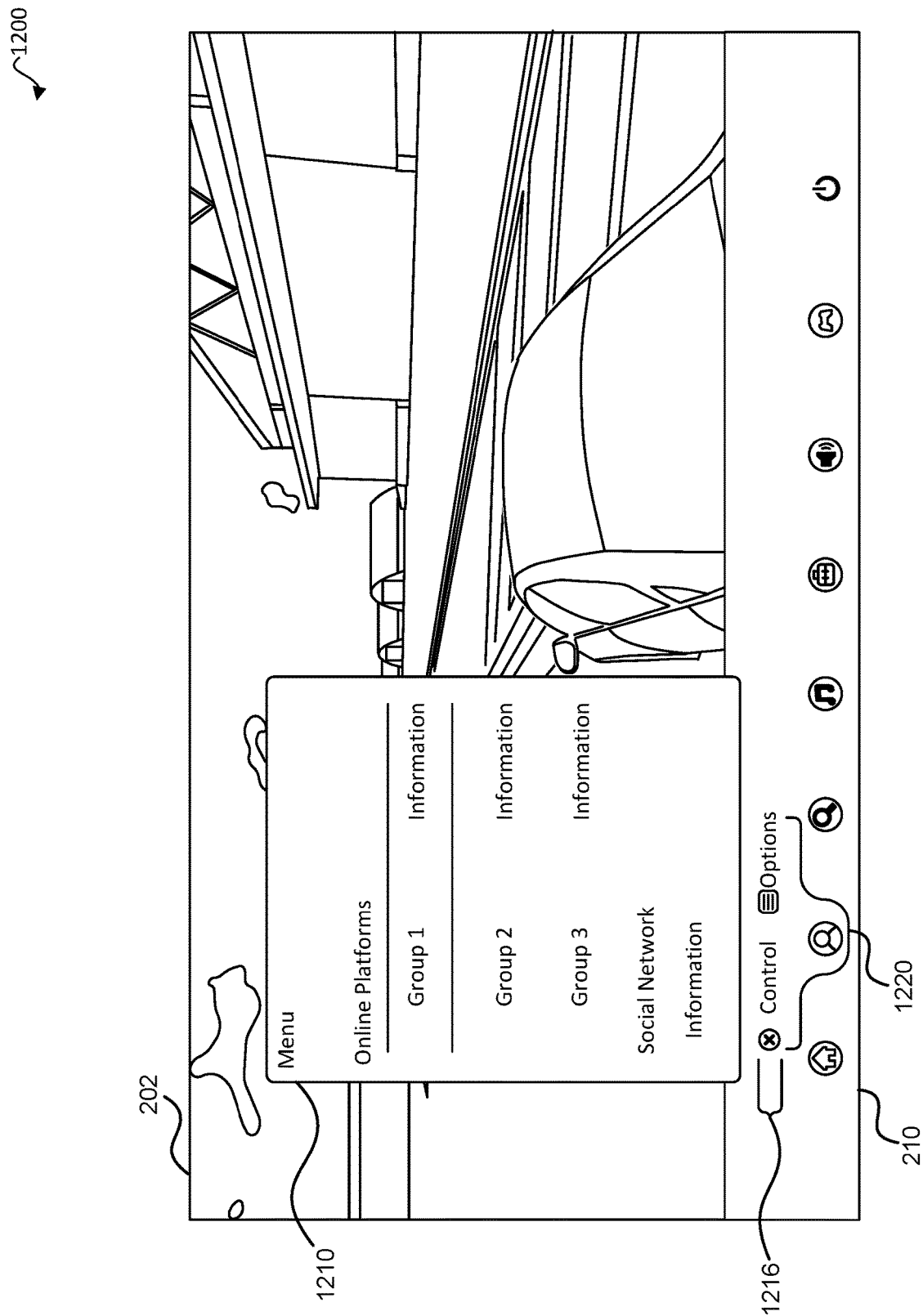
FIG. 12 illustrates an example of an online platform submenu in a menu, according to embodiments of the present disclosure.

FIG. 12 illustrates an example of an online platform submenu 1210 in a menu 1200, according to embodiments of the present disclosure. The menu 1200 may include functionality permitting the user to share content files with other users of the application (e.g., a video game application). For example, the control panel 210 may include an interactive icon 1220 linked to a social networking application (e.g., social media application 146 of FIG. 1) of the computer system. In some embodiments, selecting the interactive icon 1220 may generate and/or present an online platform submenu 1210 as a partial overlay of the application content 202. The online platform submenu 1210 may permit the user to connect to one or more content sharing groups via one or more online platforms. The online platform submenu 1210 may include configuration information for social networks (e.g., adding additional groups, removing groups, editing membership, etc.). Through configuring the social networking information for the media application, content files may be shared directly from the action cards containing recently captured content files (e.g., action card 220 of FIG. 2, action card 310 of FIG. 3, and/or action card 410 of FIG. 4). For example, selecting a share control (e.g., controls 316 of FIG. 3) in an action card may surface a menu to select one of the configured groups in online platform submenu 1210. In another example, selecting the share control may automatically share a corresponding content file to a social media account (e.g., a public social media feed).

In some embodiments, the online platform submenu 1210 may launch a messenger application and/or a content sharing platform, as described in more detail in reference to FIG. 13, below. For example, by selecting one or more groups to which a user is subscribed, a GUI may be generated and/or presented to permit the user to share recently captured content. The GUI may be generated directly from online platform submenu 1210 and/or from the action cards.

Figure 13:
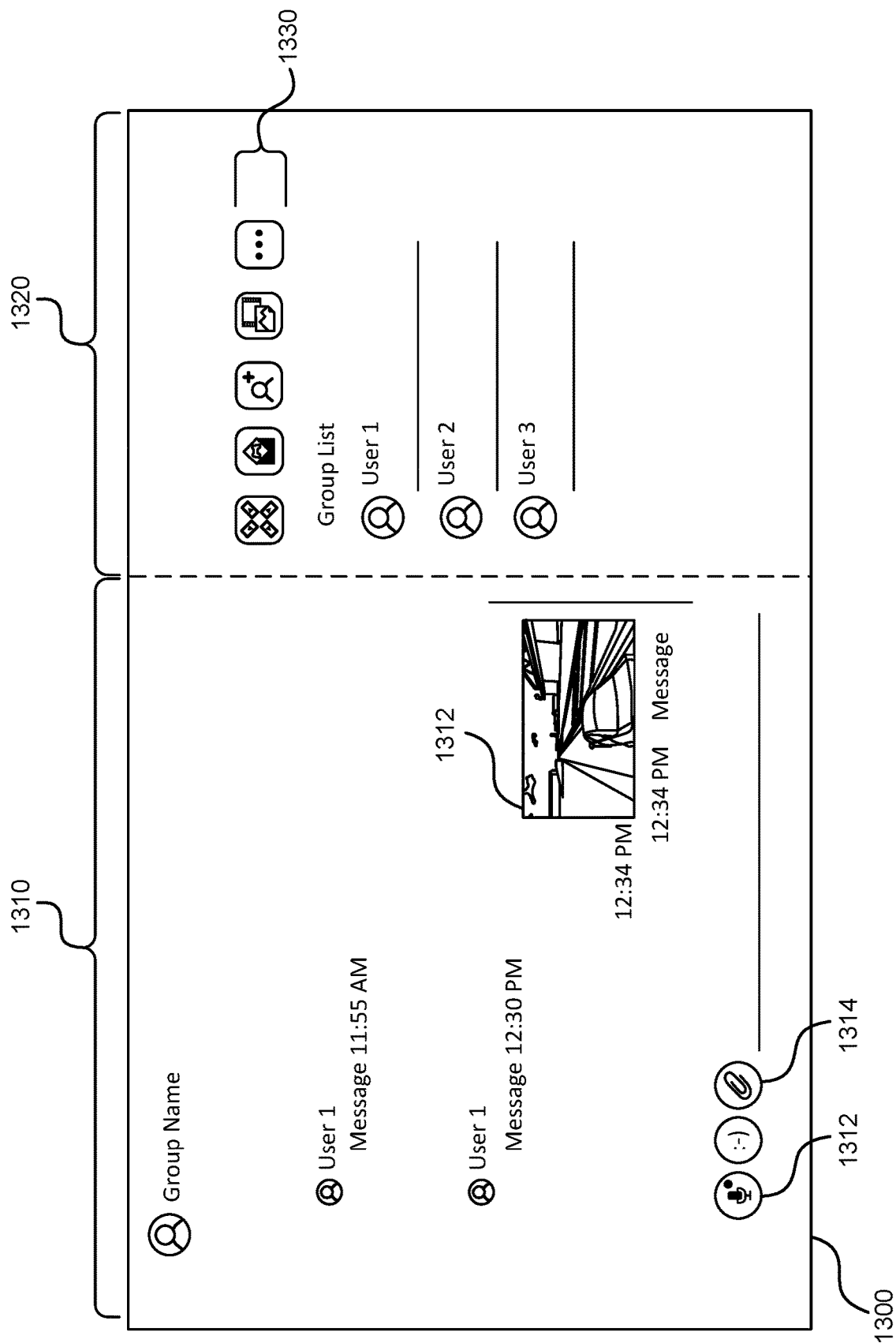
FIG. 13 illustrates an example of sharing content in a chat interface, according to embodiments of the present disclosure.

FIG. 13 illustrates an example of sharing content in a chat interface 1300, according to embodiments of the present disclosure. Launching a content sharing platform (e.g., a social media application), for example, using the online platform submenu described in reference to FIG. 12, above (e.g., online platform submenu 1210 of FIG. 12), may generate and/or present an interface to share content files with other users (e.g., other players of the video game application). Similarly, the chat interface 1300 may be launched directly from an action card (e.g., action card 310 of FIG. 3), or directly from the application (e.g., a video game application) in response to a user interaction (e.g., a button control sequence, a voice command, etc.). In some embodiments, the chat interface 1300 may partially overlay the application content (e.g., application content 202 of FIG. 2). Alternatively, the chat interface 1300 may fill the display (e.g., display 130 of FIG. 1) and may pause the application content while the user is interacting with the chat interface 1300.

In some embodiments, the chat interface 1300 may include one or more display regions including, but not limited to, a conversation pane 1310 and a control pane 1320, where a "pane" is a region of the chat interface that provides different functions and/or presents different information. For example, the conversation pane 1310 may provide a transcript of a conversation with another user or a group of other users (e.g., in real-time as messages are sent and/or received), and may facilitate sharing of content files. The chat interface 1300 may permit the user to converse using spoken words (e.g., using a speech-to-text conversion tool) recorded via a microphone control 1312. The conversation pane 1310 may include interactive controls to share content 1314 (e.g., an attachment icon).

In some embodiments, the control pane 1320 may include a membership list of the group (e.g., the users included in the conversation group), as well as social networking icons 1330. The social networking icons 1330 may permit the user to modify group membership (e.g., adding, removing group members), to return to the application, and/or to share content via multiple applications (e.g., email, social media, etc.).

Figure 14:
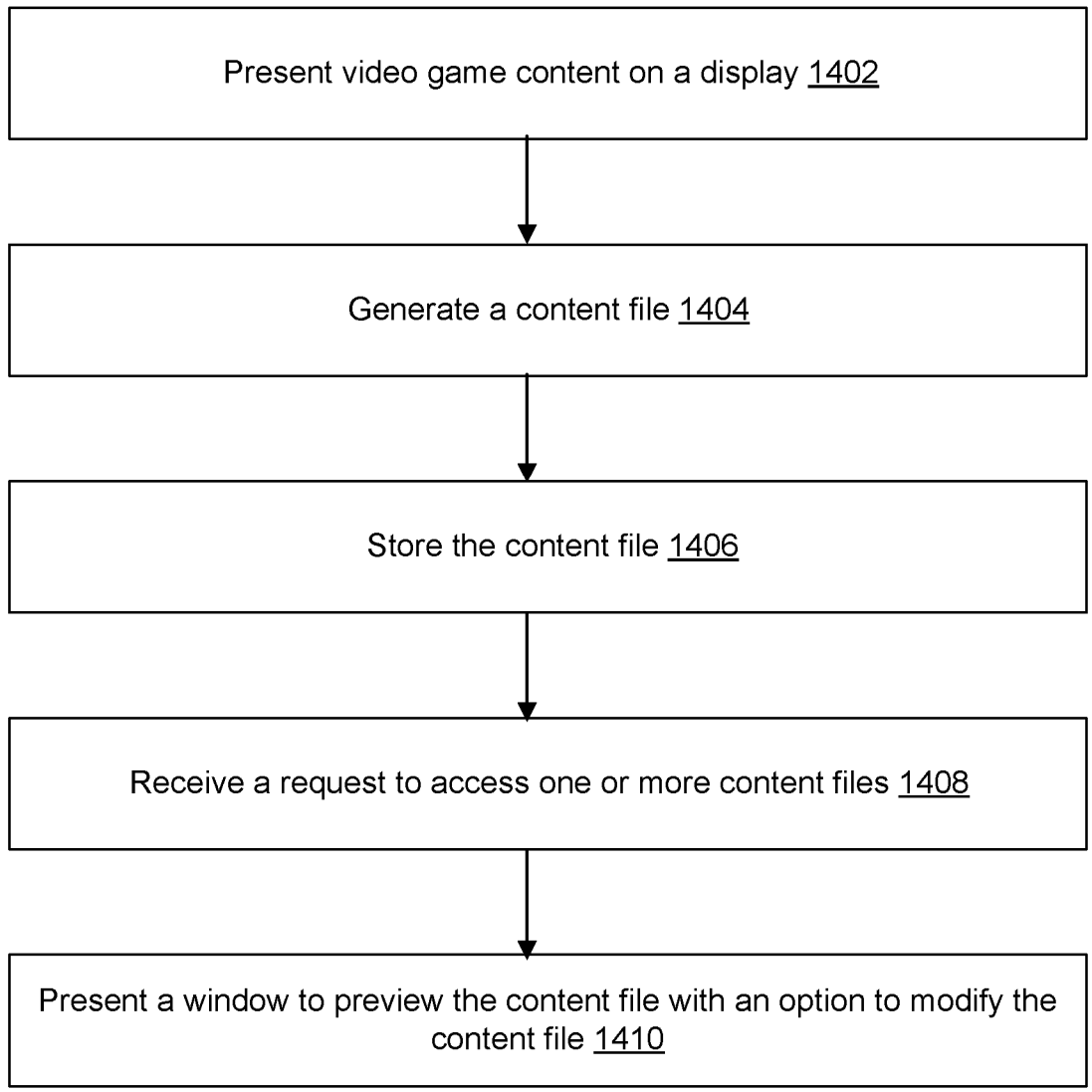
FIG. 14 illustrates an example flow for presenting content in an interactive menu, according to embodiments of the present disclosure.
Figure 15:
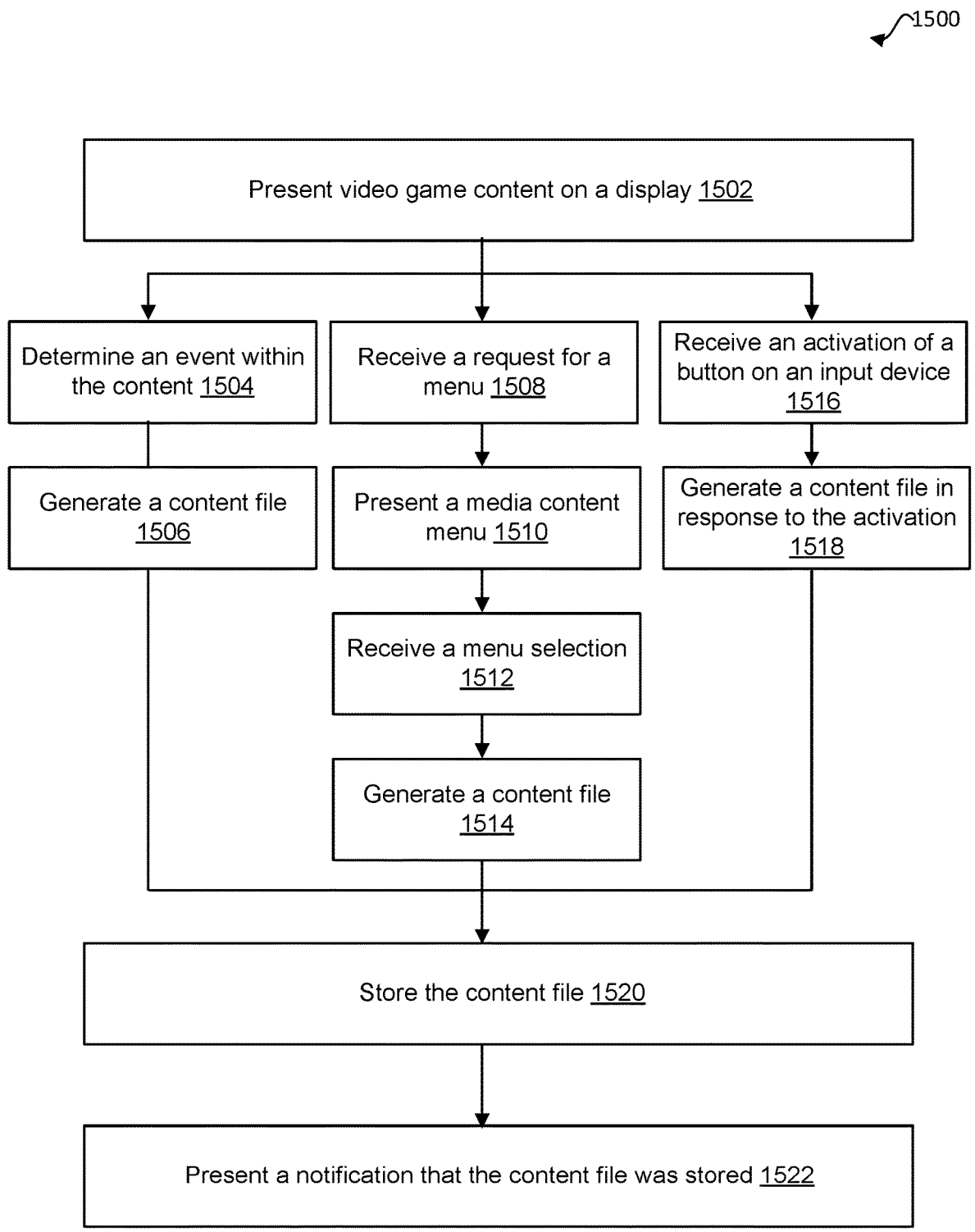
FIG. 15 illustrates an example flow for presenting content in an interactive menu, according to embodiments of the present disclosure.
Figure 16:
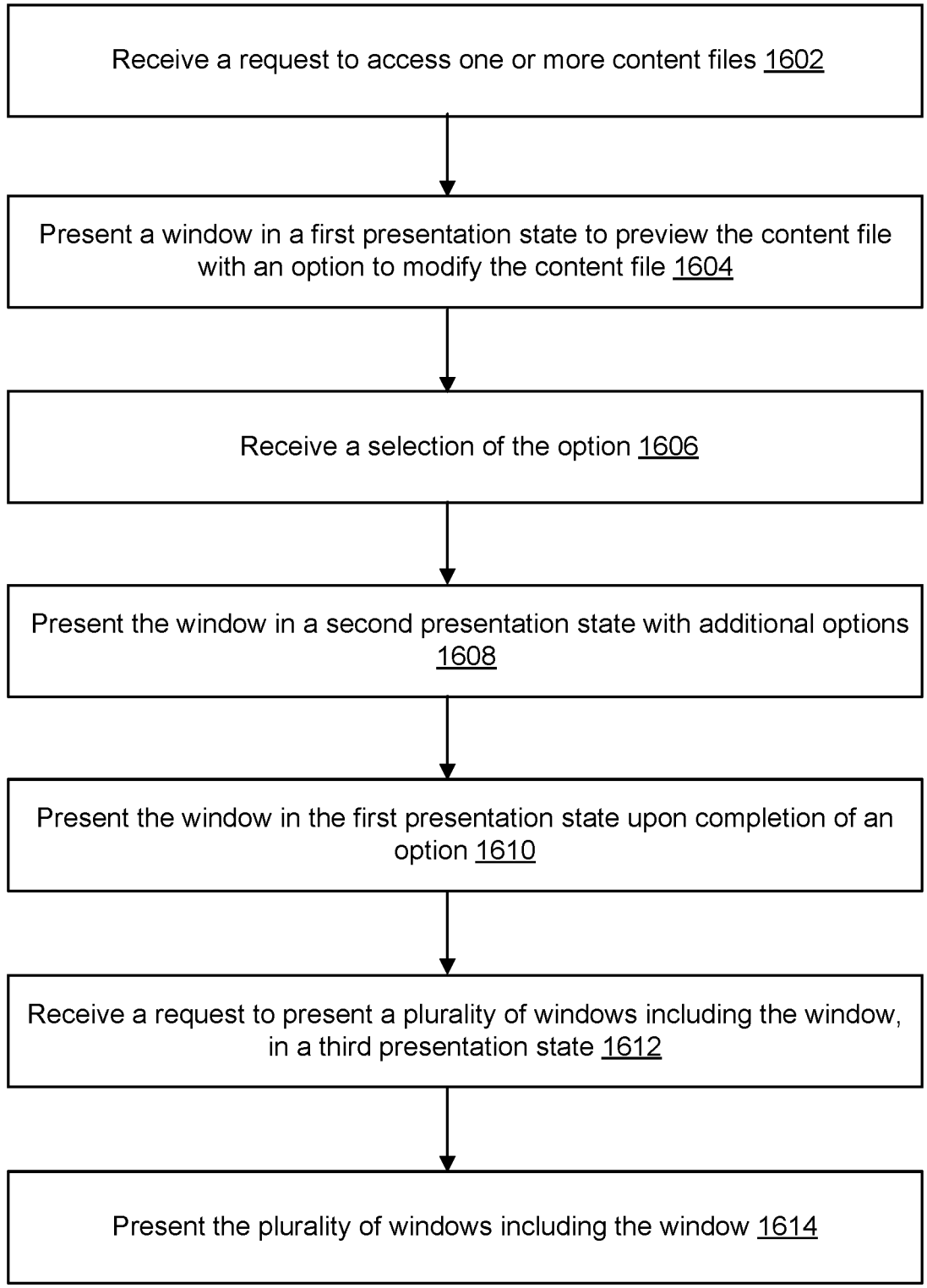
FIG. 16 illustrates an example flow for generating content, according to embodiments of the present disclosure.

FIGS. 14-16 present example flows describing one or more techniques for generating and/or presenting recently captured content of an application. The operations of the flows can be implemented as hardware circuitry and/or stored as computer-readable instructions on a non-transitory computer-readable medium of a computer system (e.g., video game system 110 of FIG. 1). As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

FIG. 14 illustrates an example flow 1400 for presenting content in an interactive menu, according to embodiments of the present disclosure. In an example, the flow includes an operation 1402, where the computer system presents video game content on a display (e.g., display 130 of FIG. 1). As described in more detail in reference to FIG. 2, the video game content (e.g., application content 202 of FIG. 2) may include gameplay content generated by a video game application (e.g., video game application 140 of FIG. 1)

In an example, the flow includes an operation 1404, where the computer system generates a content file. As described in more detail in reference to FIG. 15, below, generating the content file may include generating multiple types of content files (e.g., screenshot, video clip, replay clip, etc.), and may involve multiple approaches.

In an example, the flow includes an operation 1406, where the computer system stores the content file. Storing the content file may include storing on device storage (e.g., on memory of console 110 of FIG. 1). Additionally and/or alternatively, the content file may be stored on networked storage (e.g., using cloud storage). Stored content files may be organized in a folder associated with a media application (e.g., media application 150 of FIG. 1), the folder (e.g., a content gallery) containing recently captured content files and presented in one or more forms, as described in more detail in reference to FIGS. 2-4, above.

In an example, the flow includes an operation 1408, where the computer system receives a request to access one or more content files. The request may originate from a user interaction with a menu generated by the media application (e.g., media application 150 of FIG. 1), for example, by any one of a number of methods of interaction (e.g., controller 120 of FIG. 1, voice command, etc.).

In an example, the flow includes an operation 1410, where the computer system presents an action card to preview the content file with an option to modify the content file. As described in more detail in reference to FIGS. 2-4, the media application may generate and/or present one or more action cards as a partial overlay of the video game content on the display. The action cards may be presented in one or more presentation states including, but not limited to, a focused state (first presentation state), including a selectable option to modify the content file (e.g., by adding captions, resizing, etc.) as described in more detail in reference to FIG. 16.

FIG. 15 illustrates an example flow 1500 for presenting content in an interactive menu, according to embodiments of the present disclosure. In an example, the flow includes an operation 1502, where the computer system presents video game content (e.g., application content 202 of FIG. 2) on a display (e.g., display 130 of FIG. 1). While a user of the computer system (e.g., video game player 122 of FIG. 1) is playing, the player and/or the computer system may initiate a process to generate a content file in one or more ways, as described in operations 1504-1518, below.

In an example, the flow includes an operation 1504, where the computer system determines an event within the content. As described in more detail in reference to FIG. 1 and FIG. 7, determining an event may include identifying a start and an end of an in-game event by one or more approaches. For example, an event may be determined by metadata generated and/or available from the video game application that indicates an event (e.g., a mission, a challenge, a boss-fight, etc.). As another example, the event may be determined by a user repeating a specific task, set of controller inputs, or interactions with in-game features repeatedly (e.g., repeated retrying of a challenging in-game task). The computer system may recognize such indications and may determine based on this that an event has begun and that an event has ended.

In an example, the flow includes an operation 1506, where the computer system generates a content file. When the computer system determines that an event has begun, it may begin to generate a content file automatically (e.g., without user interaction). This may include recording a video clip, generating one or more snapshots (e.g., based on interactions between a user-controlled video game character and various in-game features and/or characters), etc. Similarly, the computer system may create a replay clip after determining that the event has ended, using video game content stored in temporary storage, as described in more detail in reference to FIG. 6.

In an example, the flow includes an operation 1508, where the computer system receives a request for a menu. Additionally and/or alternatively, the user may manually request a content file to be generated by one or more approaches. For example, the user may prompt the computer system to generate and/or present a menu (e.g., menu 500 of FIG. 5) which may include one or more interactive elements permitting the user to generate content files.

In an example, the flow includes an operation 1510, where the computer system presents a media content menu (e.g., menu 500 of FIG. 5). The media content menu, as described in more detail in reference to FIG. 5, may include a control panel (e.g., control panel 210 of FIG. 5) as a partial overlay on the video game content, which may include, but is not limited to, a snapshot control (e.g., snapshot control 512 of FIG. 5), a replay clip control (e.g., replay clip control 514 of FIG. 5), and a video clip control (e.g., video clip control 516 of FIG. 5). The media content menu may also include a settings control (e.g., parameter control 510 of FIG. 5) to set one or more content file settings including, but not limited to, image resolution, compression, and audio recording source settings (e.g., adding a microphone track or a group-chat track to video clips and replay clips). The media content menu may also include a graphical element (e.g., graphical element 518 of FIG. 5) providing instructions for alternative techniques for generating content files.

In an example, the flow includes an operation 1512, where the computer system receives a menu selection. As described in more detail in reference to FIGS. 7-9, the user may select a type of content file to generate by selecting one of the interactive controls included in the media content menu. The selection may include a configuration action (e.g., by a secondary control sequence such as a button press and/or hold), which may generate and/or present a sub-menu including configuration options for each type of content file, as shown in FIG. 6 (e.g., submenu 618 of FIG. 6).

In an example, the flow includes an operation 1514, where the computer system generates a content file. Generating the content file may include, but is not limited to, creating an instantaneous snapshot, saving an image from the temporary storage corresponding to the time at which the snapshot control was selected, generating a replay clip from video game content stored in temporary storage, beginning to record video game content as the video game content is presented to the user, as described in more detail in reference to FIG. 10.

In an example, the flow includes an operation 1516, where the computer system receives an activation of a button on an input device. In addition to the approaches described above, the user may direct the computer system to generate a content file by one or more button activations (e.g., press, hold, etc.) on an input device (e.g., controller 120 of FIG. 1). The user may also provide voice commands, gestures, and other indications to the computer system through one or more user input devices including, but not limited to, a microphone (either in the controller or in the console), a camera, motion sensor (e.g., accelerometer), etc. Each type of content file may be associated with a button activation or combination, such as a press-hold, a double-press, etc. In some embodiments, indications may also include a gesture on a touchscreen (e.g., via a user input device/peripheral or a mobile user device including a touch screen). In some embodiments, the computer system may support natural language processing and/or may include an artificially intelligent system (e.g., a "digital assistant") configured to recognize speech input additionally and/or alternatively to voice commands or keywords.

In an example, the flow includes an operation 1518, where the computer system generates a content file in response to the activation. Upon receiving the activation, the computer system may generate the associated content file. For example, a video recording may be generated in response to a single button selection or a button hold, and screenshot may be generated in response to a multi-button selection or a longer button hold. In this way, the replay clip and the video clip may be generated by single button selections of different buttons.

In an example, the flow includes an operation 1520, where the computer system stores the content file. For the approaches to generating content files described in the preceding paragraphs, the computer system may store the content file in device storage and/or in networked storage. For example, the computer system may retrieve the most recent content file to generate and/or present an action card in the glanced state to present on the menu at the next time a user requests the menu. A content gallery may organize content files in order of most recent creation, editing, sharing, etc. There may be a maximum number of files stored and/or presented in the gallery, such that files can be automatically removed from the gallery as new files are created. Additionally or alternatively to a number limit, the content gallery may remove content files exceeding a defined age. In some embodiments, content files may be removed from the content gallery (e.g., deleted from a folder associated with the media application 150 of FIG. 1) if a user deletes the corresponding application (e.g., video game application 140 of FIG. 1) from which the content files were created.

In an example, the flow includes an operation 1522, where the computer system presents a notification that the content file was stored. As described in more detail in reference to FIG. 5 and FIG. 7, the menu may include one or more graphical elements (e.g., graphical element 530 of FIG. 5) to indicate to the user (e.g., video game player) that the content file has been created and/or stored. The computer system may similarly generate and/or present the graphical element when a content file is generated in response to an event. In this way, the computer system may inform the user that a noteworthy event (e.g., an accomplishment or reward) has been recorded for sharing on a social network.

FIG. 16 illustrates an example flow 1600 for generating content, according to embodiments of the present disclosure. In an example, the flow includes an operation 1602, where the computer system receives a request to access one or more content files. As the user generates a number of content files (e.g., a gallery of screenshots and video clips), the user may wish to review the clips and/or share the clips with other users. The user may request access in one or more ways, including, but not limited to, requesting an action card (e.g., action card 220 of FIG. 2), for example, by surfacing a menu including multiple action cards for one or more applications and/or other features, as described in more detail in reference to FIG. 2. The user may select the action card to access a number of content files. The content files can also be accessed via a menu, as described in more detail in reference to FIG. 2 (e.g., control panel 210 of FIG. 2) and FIG. 11 (e.g., action card 1120 of FIG. 11), and/or via user interaction, as described above.

In an example, the flow includes an operation 1604, where the computer system presents a window in a first presentation state to preview the content file with an option to modify the content file. As described hereinabove, the window can be an action card. Nonetheless, other types of windows are similarly possible. In the focused state, the action card (e.g., action card 310 of FIG. 3; or, more generally and equivalently, the window) may present a number of content files arranged in a sequence, for example, in order of recency (e.g., most recently created, most recently played application, most recently shared and/or received, etc.). The user may cycle through the content files (e.g., gallery control 314 of FIG. 3) and may select one or more actions to take with respect to the content file being shown (e.g., editing controls 316 of FIG. 3).

In an example, the flow includes an operation 1606, where the computer system receives a selection of the option. The user may select both a content file and an action to take, and may also navigate between action cards using the options (e.g., gallery link 312 of FIG. 3, or, more generally and equivalently, windows).

In an example, the flow includes an operation 1608, where the computer system presents the window in a second presentation state with additional options. As described in more detail in reference to FIG. 4, selecting an action with respect to a content file may open a content editing card in the expanded state (e.g., action card 410 of FIG. 4; or, more generally and equivalently, the window). The content editing action card in the expanded state may include one or more additional options along with the content file (e.g., content 412 of FIG. 4), corresponding to the type of content file. For example, for a screenshot, the content editing action card may include photo-editing options (e.g., crop, rotate, zoom, resize, color correct, caption, etc.). For a video clip, video-editing options may be included (e.g., trim, splice, speed, caption, insert graphics, sound controls, etc.). The content editing action card may also include other controls (e.g., controls 414 of FIG. 4) that may allow the user to preview, cancel, save the file, etc.

In an example, the flow includes an operation 1610, where the computer system presents the window in the first presentation state upon completion of an option. After confirming the editing in the content editing action card in the expanded state, the computer system may generate and/or present a content card in the glanced state in the menu (e.g., action card 1120 of FIG. 11; or, more generally and equivalently, the window). The content card may be presented as a partial overlay of the video game content and/or a menu (e.g., control panel 210 of FIG. 11).

In an example, the flow includes an operation 1612, where the computer system receives a request to present a plurality of windows including the window in a third presentation state. As described above, the user may, when wishing to review content files (e.g., to share with other users), request an action card menu, as illustrated in FIG. 2.

In an example, the flow includes an operation 1614, where the computer system presents the plurality of windows including the window. The action card menu may include multiple action cards (e.g., action cards 222 of FIG. 2), which may be linked and/or associated with system applications and/or utilities (e.g., web browser), user applications (e.g., video game application 140 of FIG. 1), and the content gallery (e.g., action card 220 of FIG. 2). The plurality of action cards may be accompanied by a menu region (e.g., control panel 210 of FIG. 2; or, more generally and equivalently, the window) that provides additional controls (e.g., interactive icons 212 of FIG. 2) that may permit the user to access system features.

Figure 17:
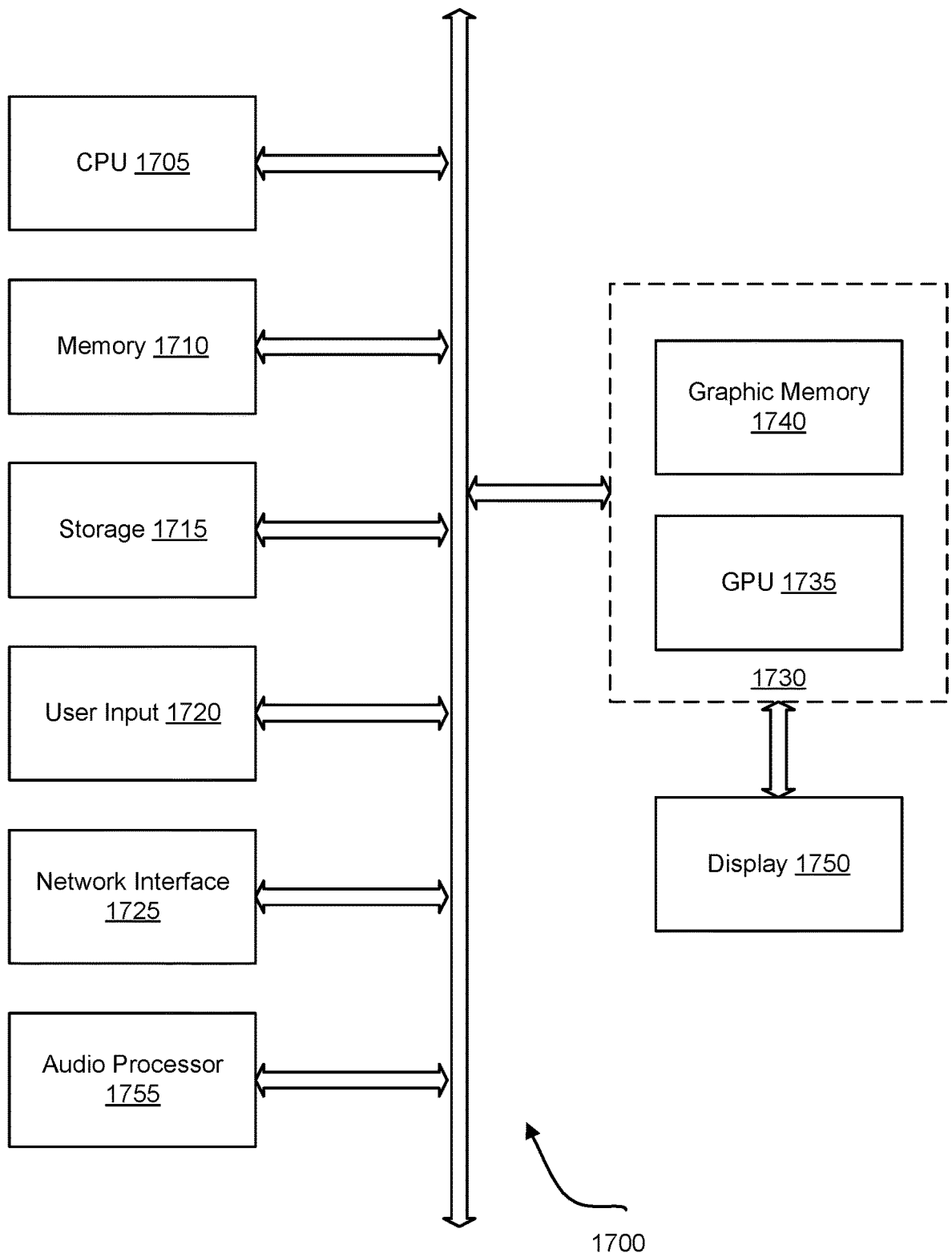
FIG. 17 illustrates an example of a hardware system suitable for implementing a computer system, according to embodiments of the present disclosure.

FIG. 17 illustrates an example of a hardware system suitable for implementing a computer system, according to embodiments of the present disclosure. The computer system 1700 represents, for example, a video game system, a backend set of servers, or other types of a computer system. The computer system 1700 includes a central processing unit (CPU) 1705 for running software applications and optionally an operating system. The CPU 1705 may be made up of one or more homogeneous or heterogeneous processing cores. Memory 1710 stores applications and data for use by the CPU 1705. Storage 1715 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1720 communicate user inputs from one or more users to the computer system 1700, examples of which may include keyboards, mice, joysticks, touch pads, touch screens, still or video cameras, and/or microphones. Network interface 1725 allows the computer system 1700 to communicate with other computer systems via an electronic communications network, and may include wired or wireless communication over local area networks and wide area networks such as the Internet. An audio processor 1755 is adapted to generate analog or digital audio output from instructions and/or data provided by the CPU 1705, memory 1710, and/or storage 1715. The components of computer system 1700, including the CPU 1705, memory 1710, data storage 1715, user input devices 1720, network interface 1725, and audio processor 1755 are connected via one or more data buses 1760.

A graphics subsystem 1730 is further connected with the data bus 1760 and the components of the computer system 1700. The graphics subsystem 1730 includes a graphics processing unit (GPU) 1735 and graphics memory 1740. The graphics memory 1740 includes a display memory (e.g., a frame buffer) used for storing pixel data for each pixel of an output image. The graphics memory 1740 can be integrated in the same device as the GPU 1735, connected as a separate device with the GPU 1735, and/or implemented within the memory 1710. Pixel data can be provided to the graphics memory 1740 directly from the CPU 1705. Alternatively, the CPU 1705 provides the GPU 1735 with data and/or instructions defining the desired output images, from which the GPU 1735 generates the pixel data of one or more output images. The data and/or instructions defining the desired output images can be stored in the memory 1710 and/or graphics memory 1740. In an embodiment, the GPU 1735 includes 3D rendering capabilities for generating pixel data for output images from instructions and data defining the geometry, lighting, shading, texturing, motion, and/or camera parameters for a scene. The GPU 1735 can further include one or more programmable execution units capable of executing shader programs.

The graphics subsystem 1730 periodically outputs pixel data for an image from the graphics memory 1740 to be displayed on the display device 1750. The display device 1750 can be any device capable of displaying visual information in response to a signal from the computer system 1700, including CRT, LCD, plasma, and OLED displays. The computer system 1700 can provide the display device 1750 with an analog or digital signal.

In accordance with various embodiments, the CPU 1705 is one or more general-purpose microprocessors having one or more processing cores. Further embodiments can be implemented using one or more CPUs 1705 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 76%, 135%, 90%, 100%, 105%, 109%, 109.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for presenting recently generated content on a display, the method implemented by a computer system and comprising:
   presenting, based on an execution of a first video game application, video game content on the display, wherein the video game content is controlled via an input device coupled with the computer system;
   generating a first content file that comprises at least one of a video or a screenshot corresponding to a first gameplay of the first video game application;
   storing the first content file, wherein the first content file is organized with other content files in a folder based on recency of each content file;
   receiving, based on user input at the input device, a request to access a plurality of content files from the folder, the plurality of content files including the first content file and the other content files, wherein the request is received while the execution of the first video game application continues;
   presenting, in response to the request, a window in a first presentation state over at least a first portion of the video game content while the execution of the first video game application continues, wherein the window previews the first content file and indicates the recency of the first content file relative to the other content files that are displayed by the window in response to a user interaction with the window, and wherein the window comprises a first selectable option to at least one of edit for length, crop, or annotate in the window any of the first content file or the other content files;
   receiving a selection of the first selectable option;
   presenting, in response to the selection of the first selectable option and over at least a second portion of the video game content while the execution of the first video game application continues, the window in a second presentation state, wherein the second presentation state comprises a first content from the first content file and an editing tool;
   receiving, based on user input at the input device, interactions with the editing tool to add additional features to the first content;
   receiving, based on user input at the input device, a request to save the first content file with the additional features; and
   storing, based on the request to save the first content file with the additional features, an edited content file in the folder, the edited content file comprising the first content and the additional features.

2. The method of claim 1, wherein the window further comprises additional options to present in the window or share from the window any of the first content file or the other content files, and wherein the method further comprises:
   presenting, while the presentation of the video game content continues, a menu over at least a second portion of the video game content, wherein the menu comprises a second selectable option to generate the first content file, and wherein the first content file is generated based on a selection of the second selectable option.

3. The method of claim 2, wherein the second selectable option comprises selectable time lengths for already stored video data, wherein the method further comprises:
   storing, in a ring buffer, video data corresponding to the video game content,
   and wherein generating the first content file comprises:
   receiving a selection of a time length from the selectable time lengths; and
   retrieving, from the ring buffer, latest video data having the time length, wherein the video of the first content file corresponds to the latest video data.

4. The method of claim 2, wherein the menu comprises a third selectable option to at least one of: select a type of the first content file, select a resolution of the video of the first content file, include audio data generated by a microphone coupled with the computer system, or include audio data received from other computer systems, and wherein the first content file is generated further based on a selection of the third selectable option.

5. The method of claim 2, wherein the menu comprises a third selectable option to request the window, wherein receiving the request comprises receiving a selection of the third selectable option.

6. The method of claim 2, further comprising:
   presenting, while the presentation of the menu continues, a notification that the first content file was generated.

7. The method of claim 1, further comprising:
storing, in a ring buffer, video data corresponding to the video game content;
determining a start and an end of an event within the first gameplay; and
retrieving, from the ring buffer, a portion of the video data corresponding to a time length between the start and the end of the event, wherein the video of the first content file corresponds to the portion of the video data.

8. The method of claim 2, further comprising:
receiving an activation of a button on the input device, wherein the button is associated with the menu, and wherein the menu is presented in response to the activation of the button.

9. The method of claim 1, further comprising:
receiving an activation of a button on the input device, wherein a first type of the activation is associated with the video and comprises at least one of a single button selection or a button hold, wherein a second type of the activation is associated with the screenshot and comprises at least of a multi-button selection or a longer button hold, and wherein the first content file is generated in response to the activation and comprises one of the video or the screenshot based on a type of the activation.

10. The method of claim 1, wherein, in response to the request, the window is presented in a first presentation state and has a first size, and wherein the method further comprises:
receiving a selection of the first selectable option; and
presenting, in response to the selection of the first selectable option and over at least a second portion of the video game content while the execution of the first video game application continues and remains visible, the window in a second presentation state and having a second size, wherein the second size is larger than the first size, and wherein the second presentation state comprises additional selectable options relative to the first presentation state.

11. The method of claim 10, further comprising:
presenting, based on the first selectable option being to present, the first content file in the window while the window is presented in the second presentation state;
present, based on the first selectable option being to edit, edit options and save options in the window while the window is presented in the second presentation state; or
present, based on the first selectable option being to share, share options in the window while the window is presented in the second presentation state.

12. The method of claim 10, further comprising:
presenting the window in the first presentation state again upon a completion of a presentation, an edit, or a share of the first content file via the window while the window was in the second presentation state.

13. The method of claim 10, further comprising:
presenting, before receiving the request and while the execution of the first video game application continues, a plurality of windows that comprise the window, wherein the plurality of windows are presented in a third presentation state, each has a third size, and each corresponds to a different application, wherein the third size is smaller than the first size, and wherein the first presentation state comprises additional selectable options relative to the third presentation state; and
receiving a selection of the window from the plurality of windows, wherein the window is presented in the first presentation state in response to the selection.

14. The method of claim 1, wherein user inputs from the input device control the window while the window is presented, and further comprising:
stopping the presentation of the window; and
switching controls of additional user inputs from the input device to the first video game application upon stopping the presentation of the window.

15. The method of claim 1, wherein the first content file is previewed in the window based on the first content file having the latest recency, and wherein the method further comprises:
receiving a user interaction with the window to preview a second content file from the folder; and
replacing, while the first selectable option remains presented in the window, a preview of the first content file with a preview of the second content file.

16. The method of claim 1, wherein the other content files comprise a video file generated by a camera coupled with the computer system.

17. A computer system comprising:
one or more processors; and
one or more memories storing computer-readable instructions that, upon execution by at least one of the one or more processors, configure the computer system to:
present, based on an execution of a video game application, video game content on a display, wherein the video game content is controlled via an input device coupled with the computer system;
generate a first content file that comprises at least one of a video or a screenshot corresponding to a gameplay of the video game application;
store the first content file, wherein the first content file is organized with other content files in a folder based on recency of each content file;
receive, based on user input at the input device, a request to access a plurality of content files from the folder, the plurality of content files including the first content file and the other content files, wherein the request is received while the execution of the video game application continues;
present, in response to the request, a window in a first presentation state over at least a first portion of the video game content while the execution of the video game application continues, wherein the window previews the first content file and indicates the recency of the first content file relative to the other content files that are displayed by the window in response to a user interaction with the window, and wherein the window comprises a first selectable option to at least one of edit for length, crop, or annotate in the window any of the first content file or the other content files;
receive a selection of the first selectable option;
present, in response to the selection of the first selectable option and over at least a second portion of the video game content while the execution of the video game application continues, the window in a second presentation state, wherein the second presentation state comprises a first content from the first content file and an editing tool;
receive, based on user input at the input device, interactions with the editing tool to add additional features to the first content;
receive, based on user input at the input device, a request to save the first content file with the additional features; and
store, based on the request to save the first content file with the additional features, an edited content file in the folder, the edited content file comprising the first content and the additional features.

18. The computer system of claim 17, wherein the execution of the computer-readable instructions further configure the computer system to:
present, while the presentation of the video game content continues, a menu over at least a second portion of the video game content, wherein the menu comprises a second selectable option to generate the first content file from already stored video data and to define a time length for the first content file; and
store, in a ring buffer, video data corresponding to the video game content,
and wherein generating the first content file comprises:
retrieving, from the ring buffer, latest video data having the time length, wherein the video of the first content file corresponds to the latest video data.

19. One or more non-transitory computer-readable storage media storing instructions that, upon execution on a computer system, cause the computer system to perform operations comprising:
presenting, based on an execution of a video game application, video game content on a display, wherein the video game content is controlled via an input device coupled with the computer system;
generating a first content file that comprises at least one of a video or a screenshot corresponding to a gameplay of the video game application;
storing the first content file, wherein the first content file is organized with other content files in a folder based on recency of each content file;
receiving, based on user input at the input device, a request to access a plurality of content files from the folder, the plurality of content files including the first content file and the other content files, wherein the request is received while the execution of the video game application continues; and
presenting, in response to the request, a window in a first presentation state over at least a first portion of the video game content while the execution of the video game application continues, wherein the window previews the first content file and indicates the recency of the first content file relative to the other content files that are displayed by the window in response to a user interaction with the window, and wherein the window comprises a first selectable option to at least one of edit for length, crop, or annotate in the window any of the first content file or the other content files;
receiving a selection of the first selectable option;
presenting, in response to the selection of the first selectable option and over at least a second portion of the video game content while the execution of the video game application continues, the window in a second presentation state, wherein the second presentation state comprises a first content from the first content file and an editing tool;
receiving, based on user input at the input device, interactions with the editing tool to add additional features to the first content;
receiving, based on user input at the input device, a request to save the first content file with the additional features; and
storing, based on the request to save the first content file with the additional features, an edited content file in the folder, the edited content file comprising the first content and the additional features.

20. The one or more non-transitory computer-readable storage media of claim 19, wherein the window is presented in a first presentation state and has a first size, and wherein the operations further comprise:
receiving a selection of the first selectable option; and
presenting, in response to the selection of the first selectable option and over at least a second portion of the video game content, the window in a second presentation state and having a second size, wherein the second size is larger than the first size, and wherein the second presentation state comprises additional selectable options relative to the first presentation state.

21. The method of claim 1, wherein the additional features comprise at least one of text or images.

22. The method of claim 1, wherein the additional features are superimposed on the first content in the edited content file.

23. The method of claim 1, wherein at least one content file of the other content files comprises at least one of a video or a screenshot corresponding to a second gameplay of a second video game application, the second video game application being different from the first video game application.

* * * * *